(12) United States Patent
Chamberlin et al.

(10) Patent No.: US 10,929,494 B2
(45) Date of Patent: Feb. 23, 2021

(54) SYSTEMS AND METHODS FOR TAGGING OBJECTS FOR AUGMENTED REALITY

(71) Applicant: Stops.com Ltd., Zefat (IL)

(72) Inventors: Eitan Richard Chamberlin, Zefat (IL); Ehud Spiegel, Petach-Tikva (IL); Nathan Akimov, Modiln (IL); Gregory Zaoui, Rosh HaAyin (IL)

(73) Assignee: Stops.com Ltd., Zefat (IL)

( * ) Notice: Subject to any disclaimer, the term of this patent is extended or adjusted under 35 U.S.C. 154(b) by 0 days.

(21) Appl. No.: 16/383,706

(22) Filed: Apr. 15, 2019

(65) Prior Publication Data

US 2019/0317974 A1    Oct. 17, 2019

Related U.S. Application Data

(60) Provisional application No. 62/657,961, filed on Apr. 16, 2018.

(51) Int. Cl.
| | | |
|---|---|---|
| *G06F 16/9537* | (2019.01) | |
| *G06T 19/00* | (2011.01) | |
| *G06F 16/432* | (2019.01) | |
| *G06F 16/909* | (2019.01) | |

(52) U.S. Cl.
CPC ........ *G06F 16/9537* (2019.01); *G06F 16/434* (2019.01); *G06F 16/909* (2019.01); *G06T 19/006* (2013.01); *G06T 2219/004* (2013.01)

(58) Field of Classification Search
None
See application file for complete search history.

(56) References Cited

U.S. PATENT DOCUMENTS

| | | | | |
|---|---|---|---|---|
| 9,495,783 | B1* | 11/2016 | Samarasekera | G06T 11/60 |
| 2013/0321411 | A1* | 12/2013 | Pahwa | G06T 17/05 |
| | | | | 345/420 |
| 2017/0199855 | A1* | 7/2017 | Fishbeck | G06T 11/60 |

OTHER PUBLICATIONS

Manweiler et al. "Satellites in Our Pockets: An Object Positioning System Using Smartphones", Proceedings of the 10th International Conference on Mobile Systems, Applications, and Services, MobiSys '12, Low Wood Bay, Lake District, UK, Jun. 25-29, 2012, p. 211-224, Jun. 25, 2012.

(Continued)

*Primary Examiner* — Yanna Wu

(57) ABSTRACT

There is provided a method of creating an augmented reality image, comprising: capturing by an imaging sensor of a mobile device, a two dimensional (2D) image of a three dimensional scene (3D) comprising objects and pixel neighborhoods, selecting with a graphical user interface (GUI) presented on a display of the mobile device, pixel(s) of the 2D image corresponding to a certain object, computing a 3D geo-location of the certain object corresponding to the selected pixel(s) of the 2D image, wherein the 3D geo-location includes an altitude relative to sea level, and wherein the 3D geo-location is geographically distinct and spaced apart from a location of the imaging sensor outputted by a location sensor, and creating a tag for the selected pixel(s) of the certain object of the 2D image according to the computed 3D geo-location within a virtual grid, wherein the tag maps to media-object(s) correspond with real world coordinates.

12 Claims, 12 Drawing Sheets

(56) References Cited

OTHER PUBLICATIONS

Snavely et al. "Photo Tourism: Exploring Photo Collection in 3D", Proceedings of the ACM SIGGRAPH 2006 Papers, Boston, MA, Jul. 30-Aug. 3, 2006, ACM Transactions on Graphics, TOG, 25(3): 835-846, Jul. 2006.

* cited by examiner

SYSTEMS AND METHODS FOR TAGGING OBJECTS FOR AUGMENTED REALITY

RELATED APPLICATION

This application claims the benefit of priority under 35 USC § 119(e) of U.S. Provisional Patent Application No. 62/657,961 filed on Apr. 16, 2018, the contents of which are incorporated herein by reference in their entirety.

BACKGROUND

The present invention, in some embodiments thereof, relates to augmented reality and, more specifically, but not exclusively, to systems and methods for tagging objects for augmented reality.

Augmented reality images and/or three-dimensional objects are created by overlaying computer generated data over real-time images of the real world. Augmented reality provides a new level of communication between a user and the real world, for example, providing an additional layer of information about the real world, and/or making inanimate objects interactive with the real world.

SUMMARY

According to a first aspect, a computer implemented method of creating at least one tag for an object within a scene for generating an augmented reality 2D image of the object that includes the at least one tag, the method comprises: capturing by an imaging sensor of a mobile device, a single two dimensional (2D) image of a three dimensional scene (3D) comprising a plurality of objects and pixel neighborhoods therein, selecting with a graphical user interface (GUI) presented on a display of the mobile device, at least one pixel of the single 2D image corresponding to a certain object of the plurality of objects, computing a 3D geo-location of the certain object corresponding to the selected at least one pixel of the single 2D image, wherein the 3D geo-location includes an altitude relative to sea level, and wherein the 3D geo-location is geographically distinct and spaced apart from a location of the imaging sensor outputted by a location sensor, and creating at least one tag for the selected pixel(s) of the certain object of the single 2D image according to the computed 3D geo-location, wherein the at least one tag maps to at least one media-object.

According to a second aspect, a system for creating at least one tag for an object within a scene for generating an augmented reality 2D image of the object that includes the at least one tag that comprises: a non-transitory memory having stored thereon a code for execution by at least one hardware processor, the code comprising: code for capturing by an imaging sensor of a mobile device, a single two dimensional (2D) image of a three dimensional scene (3D) comprising a plurality of objects, code for selecting with a graphical user interface (GUI) presented on a display of the mobile device, at least one pixel of the single 2D image corresponding to a certain object of the plurality of objects, code for computing a 3D geo-location of the certain object corresponding to the selected at least one pixel of the single 2D image, wherein the 3D geo-location includes an altitude relative to sea level, and wherein the 3D geo-location is geographically distinct and spaced apart from a location of the imaging sensor outputted by a location sensor, and code for creating at least one tag for the selected at least one pixel of the certain object of the single 2D image according to the computed 3D geo-location, wherein the at least one tag maps to at least one media-object.

According to a third aspect, a computer implemented method of creating an augmented reality image, comprises: capturing by an imaging sensor of a mobile device, a two dimensional (2D) image of a three dimensional (3D) scene comprising a plurality of objects, identifying for at least one object of the plurality of objects, at least one tag associated with a 3D geo-location and with at least one media-object stored in a dataset according to location data outputted by at least one location sensor associated with the mobile device, wherein the 3D geo-location includes an altitude relative to sea level, wherein the 3D geo-location is computed from a single 2D image of a 3D scene of objects, and wherein the 3D geo-location is geographically distinct and spaced apart from a location of the imaging sensor outputted by a location sensor, mapping the 3D geo-location of the identified at least one tag to at least one pixel of each respective object of the plurality of objects of the 2D image presented on a display of the mobile device, and presenting an augmented reality image including an indication of at least one tag associated with the at least one media-object for each respective object of the plurality of objects of the 2D image within a GUI displayed on the display of the mobile device.

According to a fourth aspect, a system for creating an augmented reality image, comprises: a non-transitory memory having stored thereon a code for execution by at least one hardware processor, the code comprising: code for capturing by an imaging sensor of a mobile device, a two dimensional (2D) image of a three dimensional (3D) scene comprising a plurality of objects, code for identifying for at least one object of the plurality of objects, at least one tag associated with a 3D geo-location and with at least one media-object stored in a dataset according to location data outputted by at least one location sensor associated with the mobile device, wherein the 3D geo-location includes an altitude relative to sea level, wherein the 3D geo-location is computed from a single 2D image of a 3D scene of objects, and wherein the 3D geo-location is geographically distinct and spaced apart from a location of the imaging sensor outputted by a location sensor, code for mapping the 3D geo-location of the identified at least one tag to at least one pixel of each respective object of the plurality of objects of the 2D image presented on a display of the mobile device, and code for presenting an augmented reality image including an indication of at least one tag associated with the at least one media-object for each respective object of the plurality of objects of the 2D image within a GUI displayed on the display of the mobile device.

At least some implementations of systems, methods, apparatus, and/or code instructions described herein relate to the technical problem of 3D tagging of real world objects for augmented reality applications. Such tagging of real world objects links computed generated media-objects (e.g. text, audio, video, websites, files) to the real-world objects and/or evens the separation 3D geo-positions of their origins and/or migrations. The real world tagged objects may be stationary and/or dynamic objects. It is noted that other described methods may perform functions other than 3D tagging of objects, for example, linking a two-dimensional geographic location to media-objects (e.g., addresses on a map), and/or tagging an entire image without consideration of the individual objects within the image.

At least some implementations of systems, methods, apparatus, and/or code instructions described herein relate to the technical problem of correlating 3D tags of real world objects located in a real world 3D scene for presentation in association with a single 2D image presented on a display.

In a further implementation form of the first, second, third, and fourth aspects, the method and/or system further comprising providing a 3D virtual grid defining a virtual coordinate system that maps the virtual coordinate system to real world physical coordinates, wherein the 3D virtual grid maps the 3D geo-location of the certain object corresponding to the selected at least one pixel of the single 2D image to the virtual coordinate system, wherein the at least one tag is stored according to the coordinates within the virtual coordinate system mapped to the 3D geo-location.

In a further implementation form of the first, second, third, and fourth aspects, the 3D virtual grid is defined as a plurality of cubes, wherein each cube is assigned a unique identification code, and virtual coordinates within each cube use a common local virtual coordinate system.

In a further implementation form of the first, second, third, and fourth aspects, the 3D virtual grid is defined as a plurality of nested cubes, wherein each cubed is assigned a unique address within the virtual coordinate system, wherein a range of real world physical coordinates corresponding to a common cube are mapped to the common cube.

In a further implementation form of the first, second, third, and fourth aspects, the method and/or system further comprising computing at least one dimension of the created at least one tag according to a distance between the 3D geo-location of the certain object corresponding to the selected at least one pixel and the location of the imaging sensor, wherein the at least one dimension is proportional to the distance.

In a further implementation form of the first, second, third, and fourth aspects, the 3D geo-location of the certain object corresponding to at least one pixel of the single 2D image is located externally to an accuracy range of the location sensor, wherein objects within the accuracy range are outputted as located in the same area by the location sensor.

In a further implementation form of the first, second, third, and fourth aspects, the method and/or the system further comprise enhancing the accuracy of the accuracy range based on at least one of: a camera focus, manual entry, and distance measurement sensor.

In a further implementation form of the first, second, third, and fourth aspects, the distance measurement sensor comprises an ultrasonic wave sensor and/or laser.

In a further implementation form of the first, second, third, and fourth aspects, the 3D geo-location of the at least one tag of the selected at least one pixel of the certain object further includes an absolute elevation relative to ground level.

In a further implementation form of the first, second, third, and fourth aspects, the 3D geo-location includes at least one of: a value indicative of an altitude below sea level, and a value indicative of a level below ground level.

In a further implementation form of the first, second, third, and fourth aspects, the 3D geo-location of the certain object corresponding to the selected at least one pixel of the single 2D image is computed according to location of the mobile device outputted by at least one location sensor associated with the mobile device, an orientation of the mobile device outputted by at least one orientation sensor associated with the mobile device, and a location of the certain object.

In a further implementation form of the first, second, third, and fourth aspects, the at least one location sensor comprises at least one of: a satellite based positioning system sensor and an altimeter.

In a further implementation form of the first, second, third, and fourth aspects, the at least one orientation sensor comprises at least one of: a compass, a magnetometer, a gyroscope, and a tilt sensor.

In a further implementation form of the first, second, third, and fourth aspects, the location of the certain object is obtained from a server storing a map of geographical and/or topographical data.

In a further implementation form of the first, second, third, and fourth aspects, the method and/or the system further comprise computing the location of the certain object according to a distance and a direction from the mobile device to the certain object.

In a further implementation form of the first, second, third, and fourth aspects, the height of the certain object above ground level is computed according to the mathematical relationship: distance from the location of the mobile device to the location of the certain object multiplied by a tangent of the tilt angle of the image sensor plus the difference between the altitude of the image sensor and the altitude of the certain object plus the height of the image sensor above ground.

In a further implementation form of the first, second, third, and fourth aspects, the height of the image sensor above ground corresponds to an estimate of an average height of an average user.

In a further implementation form of the first, second, third, and fourth aspects, the height of the image sensor above ground is according to a manually-entered height of a current user.

In a further implementation form of the first, second, third, and fourth aspects, the 3D geo-location of the certain object is set according to the location of the mobile device outputted by at least one location of the mobile device when the mobile device is located at a location correspond to the certain object, and wherein the single 2D image of the 3D scene including the certain object is captured when the mobile device is located at a location remote to the location of the certain object.

In a further implementation form of the first, second, third, and fourth aspects, the single 2D image of the 3D scene including the certain object is captured after the 3D geo-location of the certain object is set according to the location of the mobile device.

In a further implementation form of the first, second, third, and fourth aspects, the 3D geo-location of the at least one tag of the selected at least one pixel of the certain object is spaced apart from the location of the mobile device according to the location data outputted by the at least one location sensor associated with the mobile device.

In a further implementation form of the first, second, third, and fourth aspects, the 3D scene is a real world scene.

In a further implementation form of the first, second, third, and fourth aspects, the at least one tag stores a set of rules defining at least one of: dynamic movement of the certain object corresponding to the selected at least one pixel, and future times when the certain object corresponding to the selected at least one pixel is visible.

In a further implementation form of the first, second, third, and fourth aspects, the dataset stores a 3D virtual grid defining a virtual coordinate system that maps the virtual coordinate system to real world physical coordinates, wherein the at least one tag is stored according to the coordinates within the virtual coordinate system mapped to the 3D geo-location, and wherein mapping comprises mapping the 3D geo-location of the identified at least one tag to at least one pixel by the 3D virtual grid.

In a further implementation form of the first, second, third, and fourth aspects, the indication of at least one tag is presented with at least one dimension that is proportion to a distance between the 3D geo-location of the respective object and the location data of the mobile device.

In a further implementation form of the first, second, third, and fourth aspects, the 3D geo-location is external to a current location of the imaging sensor as outputted by a location sensor.

In a further implementation form of the first, second, third, and fourth aspects, objects located within the same accuracy range as outputted by a location sensor are defined as located in the same area.

In a further implementation form of the first, second, third, and fourth aspects, a plurality of tags are identified for a common ground location of a common object, each tag of the plurality of tags associated with a different height relative to the common ground location, wherein each indication of a respective tag of the plurality of tags is presented at a corresponding height of the common object depicted within the 2D image.

In a further implementation form of the first, second, third, and fourth aspects, the 2D image is extracted from a video or a live feed of the 3D scene captured by the image sensor, and wherein the capturing, the identifying, the mapping, and the presenting are iterated for 2D images extracted from the video while a user maneuvers the mobile device.

In a further implementation form of the first, second, third, and fourth aspects, the indication of at least one certain tag associated with a corresponding 3D geo-location behind a certain object located along a line-of-sight vector between the imaging sensor and the 3D geo-location is not presented on the 2D image.

In a further implementation form of the first, second, third, and fourth aspects, the method and/or the system further comprise excluding from the presentation indications associated with 3D geo-locations of tags located a distance above a threshold away from a location of the imaging sensor.

In a further implementation form of the first, second, third, and fourth aspects, the mapping is performed according to a height of each respective object of the plurality of objects, a height of the mobile device, and a distance from the image sensor to each respective object of the plurality of objects.

In a further implementation form of the first, second, third, and fourth aspects, the mapping is performed according to at least one of: a focal length of the image sensor, and a visible horizontal and vertical field of view of the image sensor.

In a further implementation form of the first, second, third, and fourth aspects, the mapping is performed by: computing a rotation matrix according to output of an orientation sensor of the mobile device, obtaining a projection matrix of the imaging sensor, mapping coordinates of the plurality of locations of the plurality of objects to 2D coordinates of a display of the mobile device according to the rotation matrix and the projection matrix, and wherein the indication of the at least one media-object of at least one tag is presented in association with the at least one pixel of the 2D image corresponding to the mapped 2D coordinates of the display.

In a further implementation form of the first, second, third, and fourth aspects, the method and/or the system further comprise converting a plurality of 3D geo-locations of the plurality of objects of the 3D scene from geographical coordinates to Cartesian coordinates relative to the location of the mobile device, and wherein mapping comprises mapping the Cartesian coordinates of the plurality of locations of the plurality of objects.

In a further implementation form of the first, second, third, and fourth aspects, each respective tag is stored in association with a location from which a 2D image of the respective object associated with the respective tag was originally captured by an image sensor, and further comprising presenting on the display of the mobile device, instruct a user to move to the location from which the 2D image of the respective object associated with the respective tag was originally captured.

In a further implementation form of the first, second, third, and fourth aspects, the indication of at least one media-object of the at least one tag is presented as a region of a plurality of pixels of the 2D image, wherein the region defines a resolution of the location of each respective object.

In a further implementation form of the first, second, third, and fourth aspects, the mobile device includes at least one of: a smartphone, and augmented reality glasses.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
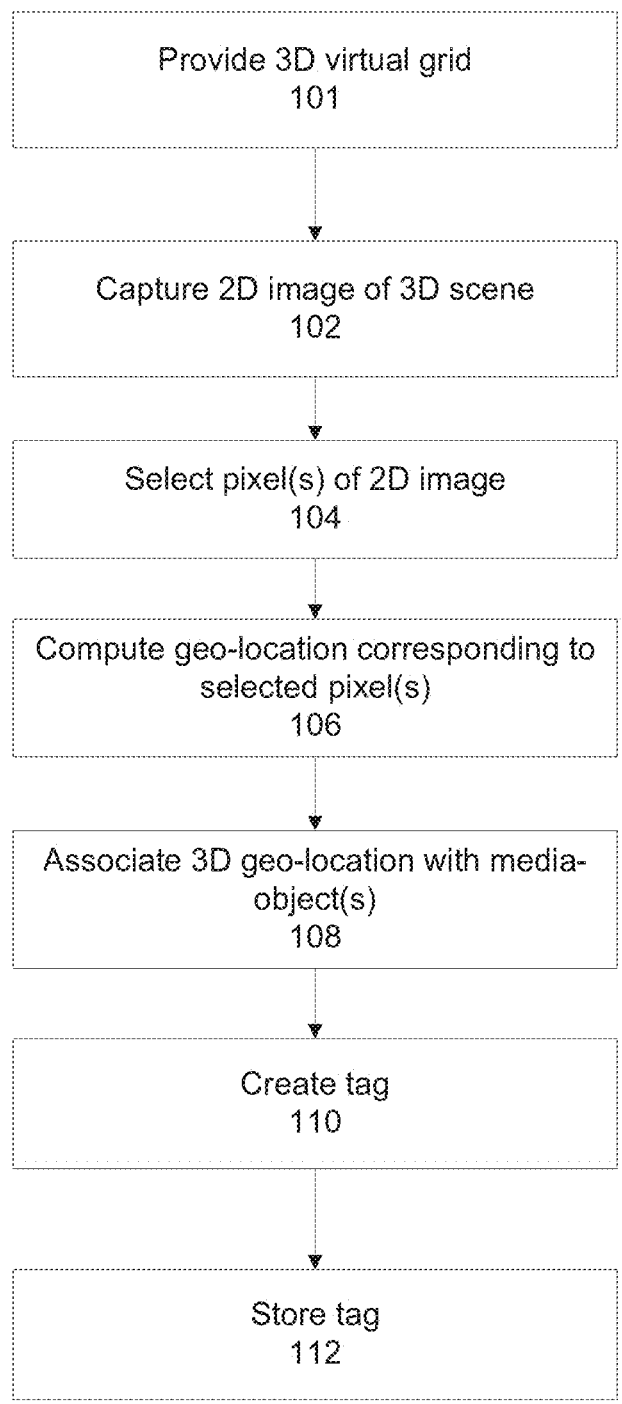
FIG. 1 is a flowchart of a method for creating a tag that includes a 3D geo-location of a real world object for the generation of an augmented reality 2D image depicting the object, in accordance with some embodiments of the present invention.

The present invention, in some embodiments thereof, relates to augmented reality and, more specifically, but not exclusively, to systems and methods for tagging objects for augmented reality.

As used herein, the term object may refer to a portion thereof, for example, a certain floor of a multi-story building, a certain tree within a forest, and/or an interesting land formation on a portion of a hill. The term object may refer to a portion (optionally a portion) of the object that corresponds to a certain single pixel or certain multiple pixels (i.e., pixel neighborhood) of the object depicted in a 2D image, for example one or more certain pixels of a work of art presented as a 2D image. It is noted that the object may be a 2D object within the 3D scene, for example, the eye of a painting of the Mona Lisa located within the 3D Louvre may be tagged.

An aspect of some embodiments of the present invention relates to systems, methods, an apparatus (e.g., mobile device), and/or code instructions (stored in a data storage device executable by one or more hardware processors) for tagging one or more pixels of one or more objects depicted in a two dimensional (2D) image, optionally a single 2D image, captured of a three dimensional (3D) scene that includes the one or more objects. The one or more objects are located at a distance away from the image sensor that captures the image, and/or the objects may be elevated above the level of the image sensor and/or at an altitude above ground. A 3D geo-location of object(s) corresponding to the tagged pixel(s) of the 2D image, optionally the single 2D image, is computed. The 3D geo-location may include the altitude of the object(s) relative to ground such as: above ground or below ground, (which may be included as absolute elevation above sea level or below sea level and/or above ground level in a specific place with the defined geo-coordinates), the height of the object(s) above the floor or beneath the floor (e.g., when the object is located on a certain floor of a multi-story building), the height of the object in proportion to the height of the user capturing the image.

Optionally, the 3D geo-location is computed based on a single 2D image of the 3D scene that includes the object(s). The 3D geo-location may be computed based on a single 2D location of the image sensor that captures the 2D image (e.g., the single 2D image). Alternatively, multiple 2D images from the same 2D location may be used to compute the 3D geo-location, for example, when the image sensor is tilted without altering the 2D location coordinates on the ground.

Optionally, a 3D virtual grid maps the 3D geo-location of the certain object to a virtual coordinate system. The 3D virtual grid defines a virtual coordinate system, which maps to real world physical coordinates (e.g., latitude, longitude, altitude). The tag(s) is stored according to virtual coordinates within the virtual coordinate system, which are mapped to the 3D geo-location of the certain object in the real physical world. For presenting the augmented reality image of the certain object, the 3D geo-location of the identified tag is mapped to pixel(s) of the 2D image depicting the certain object by the 3D virtual grid.

The 3D geo-location is geographically distinct and spaced apart from the location of the image sensor as outputted by a location sensor. The 3D geo-location may be located externally to a resolution region and/or accuracy range of the location sensor. Objects within the resolution region and/or accuracy range are outputted as located in the same area by the location sensor. For example, the resolution and/or accuracy range of a global positioning sensor may be about 10 meters (e.g., diameter). Objects within the 10 meter region are sensed by the GPS sensor as being located in the same area. Objects outside the 10 meter region are sensed by the GPS sensor as being located in a geographically distinct and/or spaced apart location. In another example, objects may be associated with a region of uncertainty based on output of the accuracy of the location sensor. Objects within the region of uncertainty are known (e.g., with high probability) to be located within the region, but the exact location within the region is uncertain. In such a case, the region of uncertainty of the image sensor and the region of uncertainty of the object(s) may be distinct.

A tag(s) is created according to the 3D geo-location. The tag(s) is associated with one or more media-objects, that optionally include content related to the tagged object(s), for example, a text, an audio message, a video, a link to a website, an information about event, and/or a live data feed. The 2D image with tag(s) of pixel(s) of object(s) serves as an augmented reality of the 3D scene that includes the objects, by conceptually providing a mechanism for a user to tag objects in the real world. For example, a user captures an image of multiple tall buildings on a city street. The user tags pixels of the 2D image corresponding to different windows of the multiple buildings, and assigns text descriptions to what is located at each respective window. For example, the 21$^{st}$ floor of one building is assigned the label "Insurance company A", and the 5$^{th}$ floor of another building is associated with a link to a web site of the travel agency located therein, and a statue located above the entrance of yet another building is tagged with a link to a movie about the artist who made the statue.

Optionally, the tag is presented with a dimension (e.g., size, such as the diameter of a circle-shaped tag) that is proportional to between the 3D geo-location of a respective object and the location data of the mobile device. The dimension of the tag may be dynamically adjusted as the mobile device is moved relative to the objects, which changes the distance to the object(s), for example, as the user walks around. Optionally, the dimension of the tag is proportional to the distance, for example, the size of the tag is decreased as the distance from the mobile device to the object corresponding to the tag that is increased (e.g., user walking away from the object), and/or the size of the tag is increased as the distance from the mobile device to the object corresponding to the tag is decreased (e.g., user walking towards the object).

An aspect of some embodiments of the present invention relates to systems, methods, an apparatus (e.g., mobile device), and/or code instructions (stored in a data storage device executable by one or more hardware processors) for presenting an augmented reality 2D image captured of a 3D real world scene and/or a 3D virtual scene with tags assigned to one or more object of the real-world. The tags, which are each associated with a 3D geo-location are mapped to pixel(s) of the 2D image that correspond to the object associated with the tag. The 3D geo-location is optionally computed from a single 2D image of a 3D scene of objects. Alternatively or additionally, the tags are mapped to pixels of 3D images that correspond to the object associated with the tag, for example, when the user captures the 3D image with a 3D camera and/or Augmented Reality (AR) and/or Mixed Reality visual aid. Each tag may be associated with a media-object, for example, content related to the respective tagged object. For example, the user captures a 2D image of a scene of a street with multiple tall buildings. The 2D image displays tags at one or more pixels of the 2D image, where each tag corresponds to the actual object in the 3D scene that maps to the object presented on the 2D image. As the user moves with the mobile device and changes the distance between the mobile device and tagged object(s), the size of the tag(s) may be dynamically updated. The user may click (e.g., "pop") the tags to learn more about the object in the 3D world. For example, when a tag on pixel(s) of the 2D image corresponding to the 21$^{st}$ floor of one building is selected, the message "Insurance company A" appears on the display. When another tag on pixel(s) of the 2D image corresponding to a statue above the entrance of another building is selected, a link to a movie about the artist who designed the statue is played.

At least some implementations of systems, methods, apparatus, and/or code instructions described herein relate to the technical problem of 3D tagging of real world objects for augmented reality applications. Such tagging of real world objects links computed generated media-objects (e.g. text, audio, video, websites, files) to the real-world objects. The real-world tagged objects may be stationary and/or dynamic objects. It is noted that other described methods may perform functions other than 3D tagging of objects, for example, linking a two-dimensional geographic location to media-objects (e.g., addresses on a map), and/or tagging an entire image without consideration of the individual objects within the image.

At least some implementations of systems, methods, apparatus, and/or code instructions described herein improve the technology of image processing, by computing a 3D geo-location for a certain object (or a portion of the object) based on a single 2D image of the scene, and/or based on a single 2D location of the image sensor that captures the 2D image (i.e., the image sensor is not displaced relative to the ground). In contrast, other processes that compute the 3D geo-location rely on multiple images of the same object, captured at different 2D locations relative to the ground, and at different directions relative to the object. For example, other processes require the user to walk around and take multiple images of the object to reconstruct a 3D point cloud of the object in order to compute the 3D geo-location. Processing a single 2D image rather than computing a point cloud from multiple 2D images is more computationally efficient, for example, requiring less processing time, less processor utilization, less network bandwidth for communicating with a server, and/or less memory.

At least some implementations of systems, methods, apparatus, and/or code instructions described herein improve the technical field of mapping the virtual world to the real world, for example, for augmented reality applications. In particular, the improvement is related to the technical problem of enabling real time mapping of the virtual world to the real world mapping, for example, real time depiction of virtual tags tagged to real world object presented on a display of a mobile device dynamically capturing 2D images of the real world as the user walks. The 3D virtual grid that defines a virtual coordinate system that is mapped to real world physical coordinates provides an improvement over other known processes. In one example, another processes relies on multiple images captured of the same real world object, where the multiple images are captured at different locations and/or different angles relative to the object. Features are extracted from the images to reconstruct a 3D structure of the object, which may be annotated (e.g., with text comments). Capturing multiple images and performing 3D reconstruction is computationally expensive (e.g., in terms of processor utilization, long processing time, big amount of data storing, large data transfer requirement, and/or large memory requirements). Real time updates of augmented reality images is not practical and cannot be performed due to the computationally inefficiency. In contrast, the 3D virtual grid describes herein, which maps the virtual world to the real world, enables real time updates of augmented reality images with virtual tags assigned to the real world, due to the computationally efficient processing.

In another example, using at least some implementations of systems, methods, apparatus, and/or code instructions described herein, a selected tag in a single 2D image (having a certain set of virtual coordinates in the 3D virtual grid) may be directly mapped to the real physical world. In contrast, using other known processes, a complex procedure of triangulation is required in order to assign an annotation to a 3D reconstruction of a real world object created from multiple 2D images each taken at different locations and/or angles.

At least some implementations of the systems, methods, apparatus, and/or code instructions described herein provide a technical solution to the technical problem of increasing accuracy of virtual tags mapped to the real world. At least some implementations of the systems, methods, apparatus, and/or code instructions described herein improve the technical field of mapping the virtual world to the real world, by increasing the accuracy of the tag. The technical problem relates to the inaccuracy in localizing to real world coordinates. For example, GPS sensors may have an error of about 10, or 25 meters or more. The real world physical location of a sensor (e.g., located on a mobile devices used by a user to capture 2D images of the real world which are augmented with tags as described herein) may not be localized, as of present, better than about 10-25 meters. The virtual coordinates of the 3D virtual grid may be defined very accurately based on resolution and/or precision and/or measurement accuracy of position sensors, for example, magnetometer, compass, gyroscope, satellite based navigation system, as described herein (e.g., associated with the mobile device), for example, about 1 millimeter, or about 1 centimeter, or about 10 centimeters, or about 50 centimeters, or about 1 meter, or about 2 meters, or about 5 meters, or other resolutions. The high resolution of the virtual coordinates enables selecting individual pixels of the captured 2D image for tagging thereof. The tags are stored using the virtual coordinates in high resolution, which are mapped to the real world. Even when the physical real world location (e.g. of the mobile device of the user) is not accurate (e.g., to within 10-25 meters), the physical real world location may be mapped, for example, to a single cube within the 3D virtual grid. For example, all locations within a range of real world physical coordinates are mapped to the same cube, regardless of where the GPS sensor is located within the range. For example, a user using a smartphone to capture an image is mapped to the same virtual cube as long as the user remains within the range (square on the earth having a length of 10-25 meters), even when the user moves around. This solves the problem of attempting to compute the location of the user (i.e., the GPS) with high accuracy. High accuracy is not necessarily required herein, since anywhere the user is located within the range is mapped to the same virtual cube. It is noted that as higher accuracy is available for determining the real world location of the user/sensor, the virtual cubes may be adjusted accordingly, and/or tags emerge more defined within nested cubes, in accordance with the resolution of the real world geo-coordinates.

The high resolution tags within the single cube may be presented within a 2D image of the real physical world, for example, as augmented images. Effectively, the 3D virtual grid enables providing (e.g., for presentation on a 2D image) tags at a high virtual location resolution even when the resolution of the location of the real world coordinates is much lower. In comparison, other processes that attempt to directly augment 3D reconstructions of the real world are unable to accurately localize the augmentation to the 3D reconstructions due to the low resolution of location sensors.

The 3D real world object may be mapped with high resolution within the 3D virtual grid, and with relatively low resolution to the coordinates of the real physical world. The low resolution to high resolution mapping enables, for example, multiple different users, each using their own mobile device with different low resolution mapping of the real world, to view their own augmented 2D images of tags of objects in the physical world with high accuracy. For example, any tags having physical coordinates within a defined range corresponding to a certain smallest common cube are mapped to the same smallest cube in general, without necessarily denoting a more exact location within the smallest cube itself. The dimensions of the smallest common cube may be set according to the resolution of commonly available position and/or orientation sensors (e.g., GPS), optionally according to the lowest available resolution. Users having sensors at the lowest resolution or better are all mapped to the same common cube.

It is noted that the 3D virtual grid may line up with an external 2D map (e.g., street map), for example, by linking pixel points and/or cubes edges. Such mapping may increase overall digital accuracy of 3D geo-locations for objects and/or help reduces mapping errors of objects.

At least some implementations of the systems, methods, apparatus, and/or code instructions described herein provide a technical solution to the technical problem of selecting pixels of an object depicted in a blurry image for tagging thereof, or in an image where the object does not appear (e.g., night image, cloudy, hazy, hidden behind another object), and/or to the technical problem of presenting augmented images with tags for objects, where there 2D image being augmented is blurry, and/or where the object does not appear and/or where the object is dynamic (e.g., migrating birds that only appear during migration system, a lake that only appears during the rainy season and disappears during the summer). At least some implementations of the systems, methods, apparatus, and/or code instructions described herein improve the technology of generating augmented images where the images are blurry, and/or the objects are not adequately visible (or visible at all). The 3D virtual grid is not dependent on image quality, and/or the object being depicted within the captured 2D image. The 3D virtual grid may map physical real world locations of objects to virtual coordinates which are presented in the 2D image (e.g., as tags of the 2D image) independently of the quality of the 2D image. Moreover, objects mapped from the physical world to the virtual world do not even need to exist, for example, tags may be assigned to the sky, or to blackness. This is in contrast to other processes, which depend on high quality 2D images of the objects in order to detect the object and/or 3D reconstructing the object, for example, to extract features from the 2D images.

At least some implementations of systems, methods, apparatus, and/or code instructions described herein relate to the technical problem of correlating 3D tags of real world objects located in a real world 3D scene for presentation in association with a 2D image presented on a display.

When the features related to by the systems, methods, apparatus, and/or code instructions described herein are taken as a whole, the combination of the features amounts to significantly more than a simple mathematical calculation of a mapping between 3D geo-location data and pixels of a 2D image. The systems, methods, apparatus, and/or code instructions described herein do not merely relate to mathematical computations (e.g., mapping between a 3D space and a 2D plane), but relate to the particular data collected, stored, and the way the data is collected by sensors and/or the way the data is collected and/or presented by the GUI.

At least some of the systems, methods, apparatus, and/or code instructions described herein improve an underling technical process within the technical field of augmented reality.

At least some of the systems, methods, apparatus, and/or code instructions described herein provide a new, useful, and non-conventional technique for using location sensors (GPS and its analogs), altimeter and/or orientation sensors (e.g., compass, gyroscope, magnetometer, tilt sensor) to map 3D geo-locations to pixel(s) of a 2D image presented on a display. In particular, the location sensors and/or orientation sensors associated with the mobile device reduce errors in mapping the 3D geo-locations to the pixels of the 2D image.

At least some of the systems, methods, apparatus, and/or code instructions described herein provide a new and useful technique for using location sensors and/or orientation sensors to more efficiency and/or more accurately map 3D geo-locations to pixels(s) of a 2D image.

At least some of the systems, methods, apparatus, and/or code instructions described herein improve the functioning of a mobile device by enabling a user to quickly and easily tag objects located in the real world via an improved user interface (e.g., GUI) that implements a particular manner for associating real world objects with 3D geo-locations by a user tagging pixels on a 2D image that correspond to the real world objects of the 3D scene depicted in the 2D image.

At least some of the systems, methods, apparatus, and/or code instructions described herein improve the functioning of a mobile device by enabling a user to quickly and easily view tags associated with real world objects located in proximity to the user, via an improved user interface (e.g., GUI) that implements a particular manner for presenting tags on pixels of objects depicted in a 2D image that correspond to real world objects of a real world 3D scene captured in the 2D image.

At least some of the systems, methods, apparatus, and/or code instructions described herein relate to a specific, structured GUI paired with a prescribed functionality directly related to the GUI's structure that is addressed to and resolves a specifically identified problem, namely, assigning tags with 3D geo-locations to real world objects via a 2D image of a scene depicting the real world 3D objects presented on the GUI, and/or presenting within the GUI tags relative to their pixel(s) of objects depicted on a 2D image that correspond to 3D geo-locations of a real world object(s) presented within a 3D scene captured in the 2D image.

At least some of the systems, methods, apparatus, and/or code instructions described herein are tied to physical real-life components, for example, sensors that measure the location and/or orientation of the mobile device, an image sensor that captures an image of the 3D scene, physical data storage devices and/or memory, physical mobile devices, physical displays presenting the GUI, and/or physical hardware processors, to overcome an actual technical problem arising in augmented reality applications.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the terms image sensor and mobile device may sometimes be interchangeable, for example, when the image sensor is integrated within the mobile device, for example, a smartphone that includes the image sensor. For example, the location of the image sensor and the smartphone may be assumed to be the same, and maneuvering the smartphone simultaneously maneuvers the image sensor.

As used herein, the term graphical user interface (or GUI) may sometimes be interchanged and/or used in conjunction with other user interfaces, for example, speech recognition systems, and gesture recognition systems.

As used herein, the term real-time may sometimes be interchanged with the term previously recorded. For example, the image(s) and/or video captured by the image sensor may be recorded and stored in a memory for playback at a future time interval.

Figure 2:
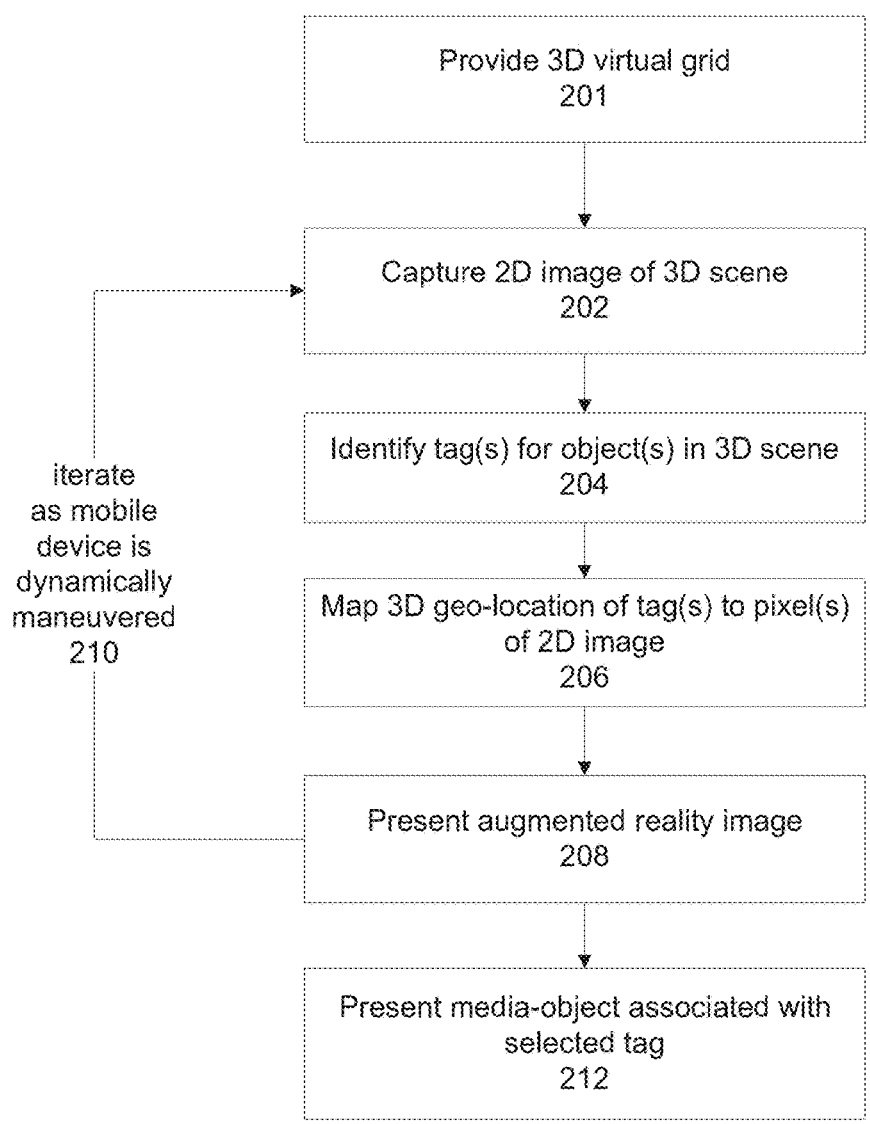
FIG. 2 is a flowchart of a method for presenting an augmented reality image that depicts one or more objects based on tags that include a 3D geo-location of the object(s), in accordance with some embodiments of the present invention.
Figure 3:
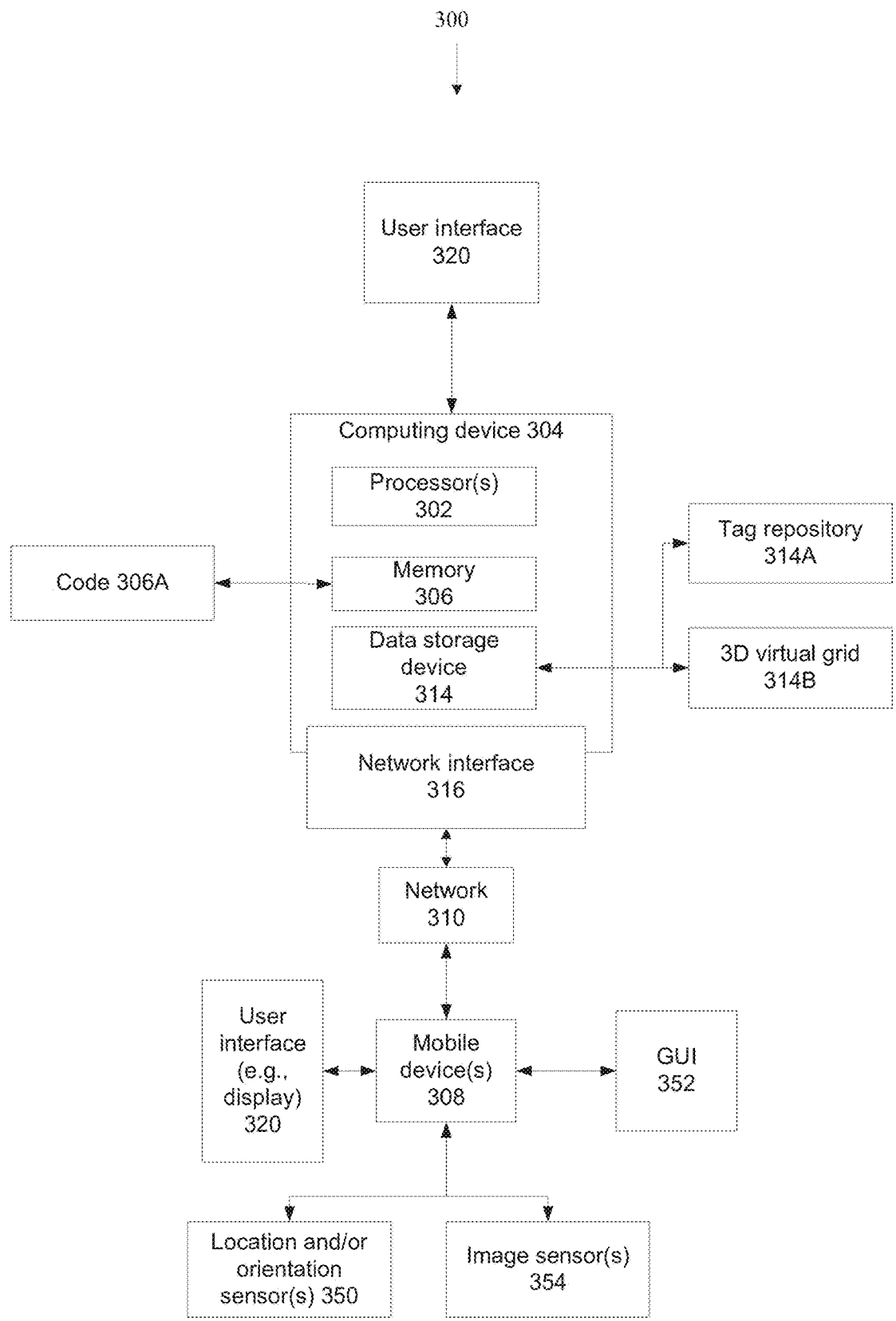
FIG. 3 is a block diagram of components of a system for creating tags for real world objects for presentation within an augmented reality image and/or for presenting augmented reality images based on tags of real world objects, in accordance with some embodiments of the present invention.

Reference is now made to FIG. 1, which is a flowchart of a method for creating a tag that includes a 3D geo-location of a real world object for generation of an augmented reality 2D image depicting the object, in accordance with some embodiments of the present invention. Reference is also made to FIG. 2, which is a flowchart of a method for presenting an augmented reality image that depicts one or more objects based on tags that include a 3D geo-location of the object(s), in accordance with some embodiments of the present invention. Reference is also made to FIG. 3, which is a block diagram of components of a system 300 for creating tags for real world objects for presentation within a display of an augmented reality image and/or for presenting augmented reality images based on tags of real world objects, in accordance with some embodiments of the present invention. System 300 may implement the acts of the method described with reference to FIGS. 1-2, by hardware processor(s) 302 of a computing device 304 executing code instructions stored in a memory 306 (also referred to as a program store).

Computing device 304 may be implemented as, for example, a server, a network server, a computing cloud, a virtual machine, and a virtual server.

Mobile device 308 may be implemented as, for example, a client terminal, a Smartphone, a Tablet computer, a laptop computer, a wearable computer, augmented reality or "mixed reality" glasses, smart glasses, smart watches, smart wearable, and an augmented reality helmet. It is noted that some devices may display 3D images captures of the 3D scene, for example, the augmented reality or virtual reality helmet and/or augmented reality glasses may display 2D and/or 3D images.

Multiple architectures of system 300 based on computing device 304 and mobile device 308 may be implemented for example:

Computing device 304 executing stored code instructions 306A, may be implemented as one or more servers (e.g., network server, web server, a computing cloud, a virtual server) that provides services (e.g., one or more of the acts described with reference to FIG. 1) to one or more mobile devices 308 over a network 310. For example, providing software as a service (SaaS) to the mobile device(s) 308, providing software services accessible using a software interface, e.g. application programming interface (API), software development kit (SDK)) running on mobile device(s) 308, providing an application for local download to the mobile device(s) 308, providing an add-on to a web browser running on mobile device(s) 308, and/or providing functions using a remote access session to the mobile device(s) 308, such as through an application executed by client terminal 308 that communicates with computing device 304.

Mobile device(s) 308 may be implemented as a stand-alone device (e.g., kiosk, client terminal, smartphone) that include locally stored code instructions that implement one or more of the acts described with reference to FIGS. 1-2. The locally stored instructions may be obtained from computing device 304 acing as a server and/or another server, for example, by downloading the code over a network, and/or loading the code from a portable storage device.

Hardware processor(s) 302 of computing device 304 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 302 may include a single processor, or multiple processors (homogenous or heterogeneous) arranged for parallel processing, as clusters and/or as one or more multi core processing devices.

Memory 306 stores code instructions executable by hardware processor(s) 302, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 306 stores code 306A that implements one or more features and/or acts of the method described with reference to FIGS. 1 and/or 2 when executed by hardware processor(s) 302.

Computing device 304 may include a data storage device 314 for storing data, for example, a tag repository 314A that stores created tags, a 3D virtual grid 314B defining a virtual coordinate system that is mapped to real world physical coordinates, and/or a media-object repository that stores media-objects and/or links to media-objects associated with the tags. Data storage device 314 may be implemented as, for example, a memory, a local hard-drive, virtual storage, a removable storage unit, an optical disk, a storage device, and/or as a remote server and/or computing cloud (e.g., accessed using a network connection).

Network 310 may be implemented as, for example, the internet, a local area network, a virtual network, a wireless network, a cellular network, a local bus, a point to point link (e.g., wired), and/or combinations of the aforementioned.

Computing device 304 and/or mobile device(s) 308 may include a network interface 316 for connecting to network 310 for communication with mobile device(s) 308, for example, one or more of, a network interface card, a wireless interface to connect to a wireless network, a physical interface for connecting to a cable for network connectivity, a virtual interface implemented in software, network communication software providing higher layers of network connectivity, and/or other implementations.

Mobile device 308 may store thereon (e.g., in a memory and/or other data storage device) code for execution of a GUI 352 for presenting the 2D augmented reality image and/or the 2D image for creation of tags, as described herein.

Mobile device 308 is associated with one or more location and/or orientation sensors 350 that sense the location and/or orientation of the mobile device for computing the 3D geo-location of the tag and/or for mapping the 3D geo-location of the tag to the 2D image, as described herein in additional detail.

Mobile device 308 is associated with one or more image sensors 354 that capture 2D images of a 3D scene, for example, a still camera, and a video camera. The still camera and/or video camera may be a 2D camera and/or a 3D camera that captures 2D images of the 3D scene, for example, 2×2D cameras or a 2D camera with a depth value for the pixels. Alternatively or additionally image sensors 354 may capture 3D images of the 3D scene, for example, a 3D camera.

Mobile device(s) 308 and/or computing device 304 include and/or are in communication with one or more physical user interfaces 320 that include a mechanism for a user to enter data (e.g., select pixels for tagging) and/or view the tags on a captured 2D image, optionally within the GUI. Exemplary user interfaces 320 include, for example, one or more of, a touchscreen, a display, gesture activation devices, a keyboard, a mouse, and voice activated software using speakers and microphone.

Referring now back to FIG. 1,

At 101, a 3D virtual grid is provided. 3D virtual grid may be stored as 314B.

The virtual grid defining a virtual coordinate system that is mapped to real world physical coordinates. Real world physical coordinates may be defined as, for example, Universal Transverse Mercator (UTM coordinates, latitude, longitude, and/or altitude). The virtual coordinate system may be defined, for example, independently of the real world physical coordinates, for example, using a different spacing between coordinates. In an exemplary implementation, the 3D virtual grid is defined as multiple cubes, that are stacked on each other, and arranged neighboring to one another. Each cube may be have a predefined size, for example, 10, or 15, or 25, or 40, or 50 meters, or other smaller, intermediate, or larger values. Each cube is assigned a unique identification value. Within each cube, a local virtual coordinate system may be used so that each tag may be mapped to specific coordinates within the virtual cube. Alternatively or additionally, each cube is further divided into smaller sub-cubes (e.g., iteratively for multiple levels), which each smaller sub-cube may be assigned a code and/or coordinate system. The local virtual coordinate system within each cube (or sub-cube) may be the same. For example, each 25 meter cube is assigned a unique ID, and within each cube an x/y/z virtual coordinate system is provided starting at (0,0,0) for the lower back left corner, and ending at (25,25,25) for the upper right front corner. Alternatively, the cube, or smallest nested cube, defines a single common virtual space that is mapped to a range of real world geo-locations, for example, a range of latitude and/or longitude and/or altitude values are mapped to the same cube as a whole, without necessarily defining virtual coordinates within the cube itself. For example, for a user using a smartphone with GPS, the location of the user is mapped to the same virtual cube even as the user walks around, as long as the user stays within the range mapped to the cube.

The size of each cube may be defined, for example, by the resolution of a position sensor that provides positioning data relative to real world coordinates, for example, a GPS sensor. Optionally, the size of the smallest nested cube that defines a common mapping for the range of real world coordinates is set according to the resolution of the positioning sensor. For example, when the resolution of the GPS sensor is about 15 meters, the edge of the cube is set to 15 meters.

The real world location of the object and/or tag within the 3D coordinate system may not be accurate, for example, within a relatively large resolution as defined by GPS sensor (or other position sensors that outputs real world position data). For example, a house, statue, or other real world object of interest may be broadly mapped to a single cube having a certain range of real world coordinates. The tag(s) created by one or multiple different users for the same object may each have a more accurate resolution defined by the virtual coordinates. The tag(s) are mapped to the 3D geo-coordinates of the object via the 3D virtual grid. For example, different users capturing different 2D images of the same object from different positions, may each create their own tag within the virtual cube of the object, or add to existing tags within the virtual cube of the object.

The virtual grid may be of various possible implementations that are mapped to the real world physical coordinates, for example defined at an angle relative to longitude and/or latitude. Alternatively or additionally, the virtual grid may be based on the real world physical coordinates, for example, defined parallel to longitude and/or latitude, where each cube is a defined amount of longitude and/or latitude.

Physical real world objects having real physical world 3D geo-locations are mapped to the virtual world using the 3D virtual grid. For example, a building located at the corner of two streets in a certain city is mapped to cube having ID HYS7645. A tag assigned to the second floor of the building is assigned coordinates (5,15,8) within the cube.

The 3D virtual grid may be defined, for example, as a mapping function that maps between real physical world coordinates and the virtual coordinates of the 3D virtual grid, a mapping table that defines locations of cubes relative to the real physical world coordinates, and/or other mapping data structures.

Optionally, each real world object and/or virtual tag is assigned two sets of coordinates that are mapped to one another by the 3D virtual grid, virtual coordinates and real world coordinates.

At 102, a 2D image of a 3D scene is captured by image sensor 354 of mobile device 308. The 2D image depicts multiple objects, optionally stationary objects, of the 3D scene, for example, buildings, terrain features (e.g., hills, valleys, beaches), roads, rocks, trees, bridges, and sculptures.

Optionally, a single 2D image of the 3D scene is captured. Alternatively, multiple 2D images from the same 2D location are captured, i.e., without displacing the image sensor relative to the ground. Alternatively, multiple 2D images from multiple 2D locations are captured.

The 2D image is presented on the display 320 of mobile device 308, optionally within GUI 352. The 2D image may be captured based on a local application running on mobile device 308 that communicates with computing device 304 over network 310.

At 104, one or more pixels of the 2D image are selected by the user, optionally via the GUI, for example, the user manually touches the screen corresponding to the location of the pixel(s) of the 2D image, and/or the user maneuvers a cursor to the location of the pixel(s).

The pixel(s) are contiguous, neighboring, and/or otherwise in proximity to one another to define a single region. The created tags described herein correspond to the location of the selected pixel(s).

As used herein, the term pixel(s) refers to regions of the 2D image that include one or more pixels. A single pixel represents the smallest possible region of the 2D image that may be selected. It is noted that the accuracy of computing and/or inputting the 3D geo-location corresponding to the selected very small regions of the 2D image may be based on the accuracy of the sensor(s) 350 and/or the accuracy of predefined locations of the mobile device 308 and/or the object, as described herein.

The user may select multiple sets of spaced apart pixels, where each sets represents a distinct tag.

The user may define a boundary region, for example, by tracing a finger on the screen to define the boundary, and/or marking the boundary with a cursor.

The 2D image may be expanded, for example, by a zoom-in feature of the application presenting the 2D image. The pixel(s) of the 2D image may be selected from the zoomed portion of the 2D image.

Optionally, the selected pixel(s) represent stationary objects, for example, buildings, electrical poles, and statues. Selection of pixel(s) corresponding to mobile objects may refer to the ground (or other surface) at the location of the mobile object, for example, selection of a car refers to the parking spot (or street) at which the car is currently located. Alternatively or additionally, the selected pixel(s) represent generally stationary objects that are dynamic, for example, a glacier that moves several meters a year around a hill in a Norwegian fiord, a river that runs dry during the summer, a lake that forms during winter runoffs, a forest that is being cut down, and an agricultural field that is being planted. In such cases, the selected pixel(s) may be associated with a set of rules manually entered by the user, selected from a set of predefined rules, and/or automatically computed based on data extracted from a source (e.g., network server). For example, the user tagging a lake may indicate using the set of rules that the lake only appears during the winter. Alternatively or additionally, the selected pixel(s) represent a capture of a dynamic object at a certain time, optionally a dynamic object with repetitive patterns, for example, pixels corresponding to an image of a plane flying in the sky, pixels corresponding to an image of a rare animal spotted in the wild, and/or pixels corresponding to an image of a flower that only blooms for a short period of time, and/or pixels corresponding to an image of a lunar eclipse and/or solar eclipse. The selected pixels may be associated with a time and/or date stamp, indicating the location of the object as captured according to the time and/or date stamp. In such cases periodicity may be manually entered by the user and/or automatically extracted by code (e.g., from a data storage device), for example, when planes are expected to be visible at the 3D geo-location, when flowers bloom at the 3D geo-location, and/or when the next eclipse is visible at the 3D geo-location.

Optionally, the selected pixel(s) is associated with a certain value within the virtual coordinate system defined by the 3D virtual grid.

At 106, a 3D geo-location of the real-world object corresponding to the selected pixel(s) of the object depicted in the 2D image is computed. The 3D geo-location represents the three dimensional location of the real-world object according to a 3D coordinate system, optionally a geographical coordinate system based on latitude degrees, longitude degrees, and altitude and/or elevation.

Optionally, the 3D geo-location is mapped to the virtual coordinates of the selected pixel(s) by the 3D virtual grid. The 3D virtual grid maps the 3D geo-location of the real world object corresponding to the selected pixel(s) of the single 2D image to the virtual coordinate system. The 3D geo-location may be mapped to a single virtual cube as a whole, as described herein. Optionally, the 3D geo-location of the object corresponding to the selected pixel(s) of the 2D image is computed according to a location of the mobile device, an orientation of the mobile device, and a location of the object.

The user may manually enter additional details that further define the 3D geo-location of the real-world object corresponding to the selected pixel(s). The additional details improve the accuracy range and/or resolution of the computed 3D geo-location. The user may mark the location of the real-world object on a two dimensional map of the surrounding terrain. The user may manually enter the height (i.e., elevation and/or altitude) of the selected object, for example, about 10 meters above ground, $6^{th}$ story or other level, or using an approximation measure such as about the height of a pole, and/or about the height of a building.

The accuracy of the accuracy range may be enhanced, for example, by a camera focus and/or a distance measurement sensor such as an ultra-sonic wave sensor and/or laser sensor.

The computed geo-location may be manually corrected by the user, for example, by a manual resetting of the geo-accuracy (figure eights) with the device via simple gestures (figure eights) and/or by manually setting the compass and/or geolocation.

The location of the mobile device is outputted by and/or computed according to output of location sensor(s) 350. The location sensor outputs a location of the mobile device, optionally within a geographical coordinate system. Exemplary location sensors include a satellite based navigation system, for example, a global positioning system (GPS) sensor, GLONASS, Galileo, that outputs two dimensional coordinates optionally latitude and longitude, and/or an altimeter that outputs altitude and/or elevation above sea level and/or above ground level.

The orientation of the mobile device is outputted by and/or computed according to output of orientation sensor(s) 350. The orientation sensor outputs an orientation of the mobile device, optionally Euler angles, for example, pitch, roll, and yaw. Exemplary orientation sensors include (but not necessarily limited to): a compass, a magnetometer, a gyroscope, and a tilt sensor.

Optionally, the location of the object is predefined, for example, stored in a dataset. The location of the object may be obtained from a server storing a map of geographical and/or topographical data which may include elevation above/below the sea level and/or buildings and/or construction heights. For example, when the object is a certain story of a tall building, the location of the building may be obtained from the server, with the 3D geo-location the certain story computed according to the location and/or orientation of the mobile device at the time of capturing the image and/or time of creation of the tag.

Alternatively or additionally, the location of the object is computed according to a distance and/or a direction from the mobile device to the object. The height of the object above ground level (and/or above sea level) may be computed according to the following mathematical relationship: the distance from the location of the mobile device to the location of the certain object multiplied by a tangent of the tilt angle (denoted alpha) of the image sensor (i.e., mobile device) plus the difference between the altitude of the image sensor (i.e., mobile device) and the altitude of the object plus the height of the image sensor above ground (and/or above sea level). In terms of the following example mathematical representation:

Object height above ground=distance*tan g(alpha)+(image sensor altitude−altitude of lowest part of the object)+ height of image sensor above ground (which may be based on a manually entered height of the user that captures the image using the image sensor).

The height of the image sensor above ground may be according to an estimate of eye height of a user and/or may be manually entered by the user. For example, an average of 160 centimeters for a user having an average height of 175 centimeters.

The altitude of the image sensor and/or the altitude of the lowest part of the object may be obtained based on location sensors (e.g., GPS) and/or obtained from a database (e.g., extracted from map geographical data).

Figure 4:
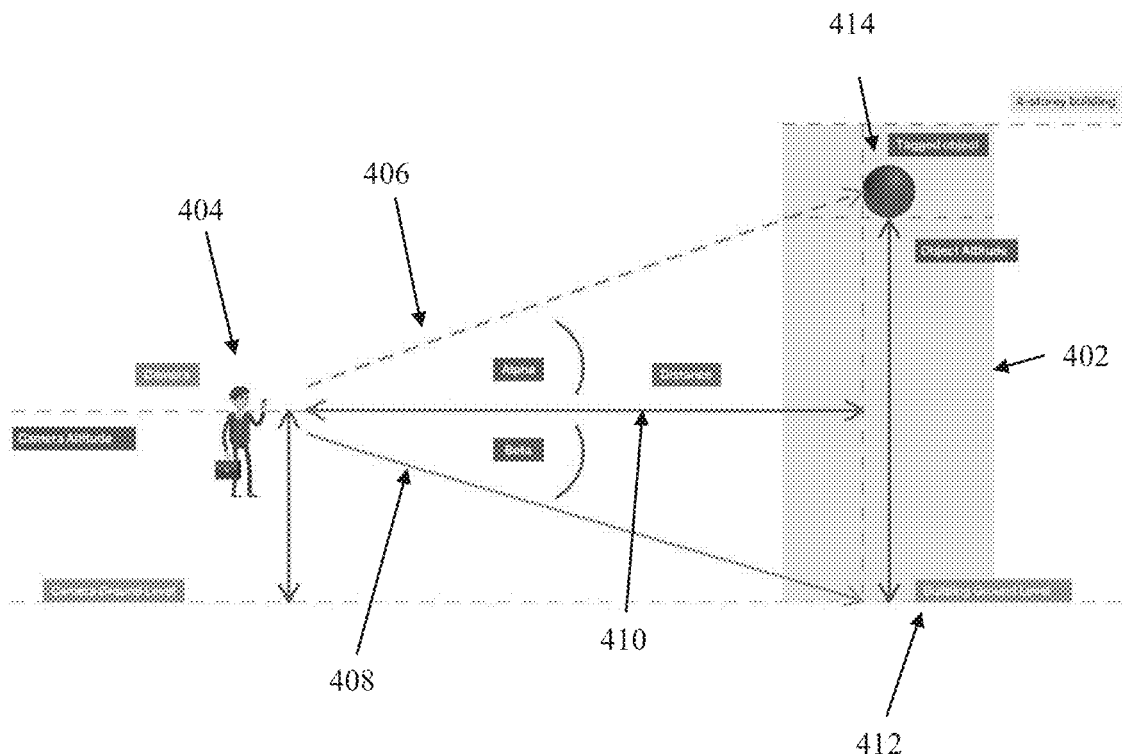
FIG. 4 is a schematic depicting computation of a height of the $4^{th}$ floor of a building that corresponds to the selected pixel(s) of the 2D image, in accordance with some embodiments of the present invention.

Reference is now made to FIG. 4, which is a schematic depicting computation of a height of a 4$^{th}$ floor of a building corresponding to the selected pixel(s) 414 of the 2D image, in accordance with some embodiments of the present invention. The height of the 4$^{th}$ floor of the office building 402 above ground 412 corresponding to the pixel(s) 414 selected by the user, is calculated as described herein, according to the height above ground of the image sensor 404 (e.g., camera), alpha 406 or beta 408 indicating the tilt of the image sensor above or below a plane parallel to the ground, a distance between the imaging sensor and the building 410, and an altitude 412 of the building 402. A dimension (denoted R) of a tag 414 corresponding to selected pixel(s) 414 is computed according to a distance from image sensor 404 to the physical location of the tagged object corresponding to selected pixel(s) 414 (e.g., the 4$^{th}$ floor of office building 402). For example, the radius of a circle shape of the tag 414 is presented according to the distance. For example, as the camera is moved closer to building 402, the distance decreases and size of tag 414 is increased, as the camera is moved away from building 412, the distance increases and size of tag 414 is decreased.

It is noted that tagged object 414 may be below the ground level 412 of building 402 (i.e., underground, and/or below sea level), for example, tagging of below ground parking spots, and/or below ground stores in a below ground shopping mall located below building 402.

Referring now back to 106 of FIG. 1, optionally, the 3D geo-location of the tag of the selected pixel(s) corresponding to the object is spaced apart from the location of the mobile device when the 2D image of the object is captured by image sensor 354 and/or when the user selects the pixel(s) to set the tag (e.g., via the GUI). For example, the 3D geo-location is located at least about 10 meters, or 25 meters, or 50 meters, or 100 meters away from the mobile device.

Alternatively, the 3D geo-location of the object is set according to the location of the mobile device when the mobile device is located at a location that corresponds to the object. For example, the user may press an icon (or provide verbal instructions into a microphone), or make a selection on the GUI, indicating that the mobile device is currently located at the location corresponding to the object.

Optionally, the 2D image of the 3D scene including the object is captured after the 3D geo-location of the object is set according to the location of the mobile device. The 2D image of the 3D scene including the object is captured when the mobile device is located at a location remote to the location of the object. The user may then move to another location from which the object is better viewed to take a picture of the object. For example, the user stands within a certain floor of a tall building to set the geo-location of the floor within the building, and then walks to a nearby park with a view of the building to take a picture of the building that includes the certain floor.

Optionally, the tag is associated with the direction and/or location of the imaging sensor that captured the 2D image of the object for creation of the tag. The direction and/or location may be automatically computed using sensor data. The direction and/or location may be automatically verified using the direction from the imaging sensor to the location of the object corresponding to the selected pixel(s). The tag may be stored with the associated direction and/or location of the imaging sensor when the 3D geo-location is outside of a defined location accuracy range. The direction and/or location of the imaging sensor may be manually entered by a user (e.g., via a GUI, such as an arrow marked on a map).

At 108, the 3D geo-location of the selected pixel(s) of object depicted in the 2D image is associated with one or more media-objects, for example, text, recorded audio, video, a link to an external web site, and an information feed. The media-objects may include content related to the object, for example, a text description of the object, a video about the object, and a link to a web site of the object. The association may be performed by the user via the GUI 352, for example, the GUI enables the user to easily associate files and/or web sites to the 3D geo-location, and/or may allow the user to record audio and/or video for association to the 3D geo-location. It is noted that the same object may be associated with other 3D geo-locations via other tags, for example, the origin of the object, where the object was created, and/or where the object was conceived.

At 110, a tag is created for the selected pixel(s) of the object of the 2D image according to the computed 3D geo-location and the associated media-object(s). The tag may be implemented as a data structure, for example, a record and/or database entry storing the 3D geo-location and a link to the associated media-object file (e.g., locally stored, or stored on a remote server).

Optionally, the created tag is associated (and optionally stored) according to the coordinates within the virtual coordinate system mapped to the 3D geo-location.

Optionally, one or more dimensions of the created tag are computed according to a distance between the 3D geo-location of the certain object corresponding to the selected pixel and the location of the imaging sensor. The dimension(s) is proportional to the distance, for example, the size of the tag is proportion to the distance. Exemplary dimensions include: diameter of a circle, length and/or width and/or diagonal of a box and/or rectangle, total area of the tag, and/or longest line between furthest two points on the tag. Exemplary shapes of presented tags having the dimension(s) include: circles, boxes, rectangles, stars, triangles, and arrows. The dimension(s) may be inversely proportional to the distance, where the dimension is smaller for increasing sizes (e.g., smaller tag for longer distances). Alternatively, the dimension(s) may be directly proportional to the distance, where the dimension is larger for increasing sizes (e.g., larger tag for longer distances), selected for example, for certain screen types (e.g., small screens depicting large distances), according to context, according to associated media-objects. Exemplary relationships between dimension(s) and the distance include, for example, linear, non-linear, exponential, logarithmic, step wise (e.g., one size for 0-5 meters, another size for 5-10 meters, a third size for >10 meters), and/or according to a set-of-rules (e.g., manually defined and/or automatically computed). The relationship between dimension(s) and the distance may based on a normalization and/or relative distances, for example, using the shortest distance and longest distance as baselines, and/or according to screen size defining smallest and largest reasonable tag sizes. For example, the smallest sized tag is set for the longest distance, the largest sized tag is set for the shortest distance, and intermediate tags are sized relative to the intermediate distances having a relative size between the smallest and largest sizes. The tag may be stored in association with the computed dimension(s) for future presentation. Alternatively or additionally, the tag is stored in association with distance, and/or with data for computing the distance. In such a case, the dimension of the tag may be computed when the tag is presented, for example, to customize the dimension(s) for the screen and/or based on configuration parameters of the display.

Optionally, the selected pixels of the created tag may be cropped out of the original picture and stored as a separate image object independent from the original scene. The cropping may be executed as part of the tag creation process, and/or executed at a later processing stage. The cropping may be performed based on the stored location of the pixels of the tag within the image (e.g., x, y coordinates and/or other dimensions (e.g., length, height).

Optionally, the position of the selected pixel(s) within the image are stored in association with the created tag; for example, the coordinates (e.g., x, y) of the selected pixel(s) within the captured image and/or according to the screen. The 0,0 vale of the x,y coordinates may be, for example, set at the top left side of the image and/or screen. One or more dimensions (e.g., height, length, diameter, border) of the selected pixels within the captured image may be stored in associated with the created tag.

The tag may be locally created at mobile device 308, for example, by GUI 352, and transmitted to computing device 304 over network 310. Alternatively or additionally, the tag may be created by computing device 304.

At 112, the created tag is stored in tag repository 314A. The created tag may be stored with virtual coordinates mapped to a real world 3D geo-location via 3D virtual grid 314B. The stored tag may be made available to other users that capture 2D images of a 3D scene that includes the object associated with the tag, for creation of augmented reality images that include the stored tag. Such users may click on the tag to access the media-object associated with the object and then optionally physically travel to the object (e.g., by walking, riding a bike, or driving) and/or virtually travel to the object (e.g., by accessing a web site associated with the object and/or navigating a virtual map and/or navigating a virtual world created from images of the physical world). User security settings may define which other users are granted access to the tags, for example, all users, certain defined friends, and all contacts stored in a contact application. The tag may be set as a private tag for viewing only by its creator.

Tag repository 314A may be made available for access by other augmented reality applications, for example, via a software interface such as an application programming interface and/or software development kit. The other augmented reality applications may utilize the computed 3D geo-locations in other applications. Exemplary augmented reality applications include ARcore, ARKit, Microsoft Hololens™ and smart wearables.

Referring now to FIG. 2, at 201, a 3D virtual grid is provided. The 3D virtual grid is described herein, for example, with reference to act 101 of FIG. 1.

At 202, a 2D image of a 3D scene that includes one or more objects is captured, for example, as described with reference to act 102 of FIG. 1.

The 2D image may be extracted as a frame of a video of the 3D scene. The video may be a live-feed and/or a pre-recorded video.

At 204, one or more tags associated with objects located in proximity to the location of the mobile device are identified. The tags may be identified by searching records of tags stored in tag repository 314A according to the real time location of the mobile device. For example, tags having geo-locations within about 100 meters, or 250 meters, or 1 kilometer, or 2 kilometers of the location of the mobile device are identified.

Optionally, the 3D geo-locations of the tags are each computed based a single 2D image of a 3D scene of objects, as described herein.

At 206, the 3D geo-location of the identified tag(s) are mapped to one or more pixels of respective objects depicted in the 2D image presented on the display of the mobile device, optionally within GUI 352.

The mapping may be performed by the 3D virtual grid, which maps the 3D geo-location of the tag to virtual coordinates of the pixels of the objects depicted in the 2D image.

The mapping may be performed according to a height (i.e., elevation and/or altitude) of each respective object, a height of the mobile device, and a distance from the mobile device (i.e., the image sensor) to each respective object. The mapping may be performed according to a focal length of the image sensor, and/or a visible field of view of the image sensor (i.e., horizontal and/or vertical field of view).

An exemplary method of mapping the 3D geo-location(s) to pixel(s) of the 2D image is now described. Each 3D geo-location of respective objects of the 3D scene may be converted from geographical coordinates (i.e., latitude, longitude, altitude and/or elevation) to Cartesian coordinates (i.e., x-y-z space) relative to the location of the mobile device. For example, the location of the mobile device is set at Cartesian coordinates (0,0,0). Conversion from geographical coordinates to Cartesian coordinates may be performed, for example, as described with reference to "*Converting GPS Coordinates to Navigation Coordinates (ENU)*" by S. P. Drake of Surveillance Systems Division Electronics and Surveillance Research Laboratory, incorporated herein by reference in its entirety. A rotation matrix is computed according to output of the orientation sensor(s) of the mobile device. A projection matrix of the image sensor is obtained (e.g., from a data storage device) and/or computed. The coordinates (i.e., Cartesian coordinates when the Cartesian coordinates are implemented) of the objects are mapped to 2D coordinates of the display of the mobile device according to the rotation matrix and the projection matrix. The Cartesian coordinates are mapped to pixels of the 2D image presented on the display.

At 208, an augmented reality image is created and presented on the display of the mobile device, optionally within the GUI. The augmented reality image includes the 2D image of the 3D scene captured by the imaging sensor, with indications at respective pixels corresponding to the geo-locations of the tags. Each indication may be presented as a marking that is distinct with respect to the image, for example, a circle of a color not appearing in the immediate neighborhood of the image, an arrow, a star, and a short text message.

The presentation of the indications within the 2D image may be according to the virtual coordinates of the indications mapped to the geo-locations by the 3D virtual grid.

As used herein the term indication may refer to the indication of the tag, the object, the 3D geo-location of the object, and/or the media-object, since the tag maps geo-locations of the object to one or more media-objects. The terms indication of the media-object and indication of the tag and indication of the 3D geo-location of the object and indication of the object may sometimes be interchanged. For example, selecting the indication may open a window for the tag listing the associated media-objects from which one media-object may be selected, or selecting the indication may directly open the media-object.

Optionally, the indication of each tag is presented with a respective dimension that is proportion to the distance between the 3D geo-location of the respective object and the location data of the mobile device. The distance may be dynamically computed and the dimension may be dynamically adjusted in the presentation as the user navigates the mobile device, for example, moving closer or away from the object associated with the respective tag, and/or as the user moves in a curve or line relative to the scene, such that distance to objects is increased and distance to other objects is decreased. The dimension(s) is proportional to the distance, for example, the size of the tag is proportion to the distance. For example, as the user walks with the mobile device, tags associated with objects that become relatively closer to the mobile device are adjusted to be presented with relatively larger sizes, and tags associated with objects that become relatively farther away from the mobile device are adjusted to be presented with relatively smaller sizes. Exemplary dimensions include: diameter of a circle, length and/or width and/or diagonal of a box and/or rectangle, total area of the tag, and/or longest line between furthest two points on the tag. Exemplary shapes of presented tags having the dimension(s) include: circles, boxes, rectangles, stars, triangles, and arrows. The dimension(s) may be inversely proportional to the distance, where the dimension is smaller for increasing sizes (e.g., smaller tag for longer distances). Alternatively, the dimension(s) may be directly proportional to the distance, where the dimension is larger for increasing sizes (e.g., larger tag for longer distances), selected for example, for certain screen types (e.g., small screens depicting large distances), according to context, according to associated media-objects. Exemplary relationships between dimension(s) and the distance include, for example, linear, non-linear, exponential, logarithmic, step wise (e.g., one size for 0-5 meters, another size for 5-10 meters, a third size for >10 meters), and/or according to a set-of-rules (e.g., manually defined and/or automatically computed). The relationship between dimension(s) and the distance may be based on a normalization, for example, using the shortest distance and longest distance, and/or according to screen size defining smallest and largest reasonable tag sizes.

Each indication(s) presented on the 2D image is associated with one or media-objects of the defined tag mapped to the pixel(s) of the 2D image.

Optionally, when multiple tags are identified for a common ground location of a common object (e.g., latitude and longitude coordinates that are considered the same due to being in proximity within a defined resolution and/or accuracy range, common street address, X-Y Cartesian coordinates), but each tag is associated with a different height above the common ground location (e.g., altitude, elevation, Z Cartesian coordinate), the indication of the media-object (s) associated with each respective tag is presented at a respective height of the common object depicted within the 2D image For example, when multiple tags are identified for a certain multi story building, where each tag is for a different floor, the 2D image may present the indications as a column along the long axis of the building, with each indication presented at pixels corresponding to the respective floor of the building.

Optionally, when multiple tags are identified for a small pixel neighborhood, the indications of the tags may be aggregated. The aggregated tags may be shown as distinct indications when the user performs a zoom-in operation to expand the small pixel neighborhood or expand a list of tags associated with the same pixel neighborhood.

It is noted that the 2D image representing the 3D view may be converted into a 2D map, radar, and/or aerial view.

Optionally, indications of media-objects associated with objects that are not visible within the 2D image are excluded from the presentation. For example, indications of objects that are located behind larger objects. The indication of the media-object(s) of a tag associated with a corresponding 3D geo-location behind a certain object located along a line-of-sight vector between the imaging sensor and the 3D geo-location is not presented on the 2D image. Alternatively, such indication are presented with a distinct marking to indicate that the associated objects are present but not visible, for example, using a distinct color and/or pattern. Indications of media-objects associated with objects that are outside of the field of view, but would be otherwise visible by a rotation of the image sensor, may be presented on the 2D image. For example, a distinct marking indicating to the user to rotate the image sensor to be able to access the indication, for example, an arrow indicating the direction for rotation of the image sensor.

Optionally, indications associated with 3D geo-locations of tags located a distance above a threshold away from a location of the imaging sensor are excluded from the presentation. For example, located over about 500 meters, or 1 kilometer (km), or 3 km, or 5 km, or other values. Excluding and/or filtering indications of 3D geo-locations located far away helps to prevent screen cluster, for example, when the 2D image taken of a hut on a mountain includes a town located in the valley, indications of the town may be excluded to prevent a cluster with indications in the small pixel area representing the town, and/or may be filtered out by keywords and/or predefined hashtags entered or chosen by the user via the GUI.

Optionally, one or more tags may be stored in association with a location, optionally a 3D geo-location, from which the 2D image of the respective object associated with the respective tag was originally captured by an image sensor. Instructions may be presented within the GUI on the display, indicating for a user how to move to the location from which the 2D image of the respective object associated with the respective tag was originally captured. For example, the user may be presented with text and/or verbal instructions on how to walk to the location, an arrow pointing to the location, and/or a map indicating the location and itinerary. The location may represent a better visual view of the object for the user, in comparison to where the user is currently located. The text and/or verbal instructions may be created by accessing a navigation application for generating the instructions.

Optionally, the indication(s) is presented as a region of multiple pixels of the 2D image that defines a resolution of the location of the respective object. For example, when the object is small compared to the 2D image, and/or the resolution of one or more sensors used to compute locations is relatively low, the region defines a region of uncertainty. The region of uncertainty represents where the object is expected to be found without additional accuracy to the exact location of the object (i.e., the object is to be found somewhere within the region). The region may be, for example, shown as a circle, square, or probability cloud according to the probability of where the object is expected to be located. It is noted that the accuracy of the location of the object may be increased as described herein, in which case the size of the region may be reduced accordingly.

At 210, acts 202-208 are iterated as the mobile device is dynamically maneuvered, for example, the user rotates the image sensor (i.e., the mobile device) to scan the surrounding scene, and/or walks while holding the mobile device. A video (i.e., multiple sequential images) of the 3D scene may be captured and shown in real-time as the user dynamically maneuvers the mobile device. 2D images may be extracted in real-time from the video as individual frames, with frames processed to create augmented reality images as described herein. The GUI may be dynamically updated in real time with indications that are relevant for the real time 2D image (i.e., frame) of the video. It is noted that every frame may not necessarily be processed as an augmented reality image. For example, every $10^{th}$ frame (or other number) may be processed, or processing of frames may be triggered by detection of significant changes in orientation and/or location of the mobile device, and/or the user may manually press an icon to trigger processing of the current image into an augmented reality image.

The mobile device (or a stationary device, such as an on-board navigation system) may be installed in a moving vehicle, for example, a car, a bus, an off-road vehicle, a boat, a plane, an autonomous drone, and/or autonomous vehicle. In such implementation, tags may be dynamically updated and presented on the 2D images during maneuvering of the vehicle, even in poor visibility conditions, for example, at night, fog, and/or haze. The tags may be indicative of objects of interest along the way, and/or objects to avoid, which may not appear on 2D maps. For example, to guide off-road driving at night in country fields to avoid driving in holes in the ground that suddenly appeared due to a storm, which have been tagged by other drivers. In another example, to guide tractors and/or other building vehicles away from sites (e.g., not yet on 2D maps) that might damage areas of the site that should not be driver over, for example, septic tanks, optical cables, and a patch of rare flowers and/or other endangered wildlife species.

At 212, a certain media-object or preview thereof may be presented, optionally within the GUI, when the user selects the respective indication. For example, the user may touch the screen at the location corresponding to the indication, may hover a cursor over the indication, and/or may click the indication using the cursor. Selecting the respective indication may, for example, open a window to a website linked to the tag, play a video linked to the tag, show an image linked to the tag, play an audio file linked to the tag, and/or present a text message linked to the tag and/or as an Augmented Reality character.

As described with reference to FIG. 1 and/or FIG. 2, location data outputted by a location sensor is used to compute the 3D geo-coordinates corresponding to the selected pixel(s) of the 2D image and/or to map the 3D geo-coordinates to the 2D image. It is noted that the accuracy and/or resolution of the location data may be low, which may result in inaccuracies, such as computing the 3D geo-coordinates (or presenting the indication associated with the 3D geo-coordinates) as incorrectly being behind the user when the image sensor held by the user is facing forwards. For example, GPS accuracy and/or resolution may usually be as high as about 3-4 meters, as such during good weather condition, direct view to satellites, and minimal reflection from higher surrounding buildings. However, GPS accuracy and/or resolution may be reduced to about 50 meters (under adverse conditions), which may be insufficient for accurate computation of the 3D geo-coordinates. Alternatively, the 3D geo-coordinates corresponding to the selected pixel(s) of the 2D image may represent a region based on the accuracy and/or resolution of the location sensor. For example, even when the GPS accuracy and/or resolution is about 5-10 meters, the 3D geo-coordinates may correspond to the entire 5-10 meter region of uncertainty.

Optionally, the accuracy and/or resolution of the GPS output is analyzed relative to a requirement such as a threshold. When the requirement of the accuracy and/or resolution of the GPS is satisfied, the value outputted by the GPS is used. When the requirement of the accuracy and/or resolution of the GPS is not satisfied, the value outputted by the GPS is either not used, is compensated for and/or trimmed. Some examples for compensation of the GPS output are now described:

When the selected pixel(s) correspond to an object having pre-existing coordinates, and/or known distance to the object, and/or an existing tag, the location of the imaging sensor may be computed accordingly. The existing location of the object may be obtained, for example, from other tags of the same object stored in the tag repository and/or from other databases such as maps that store partial locations such as 2D ground coordinates. The height is then computed and added as described herein.

The 3D geo-location of a certain tag may be triangulated by leveraging multiple mobile devices of multiple users that capture the object corresponding to the 3D geo-location using different devices, at different viewing locations, and/or that are associated with different location sensors. The data from the multiple devices may be aggregated for correcting the 3D geo-location.

Output of orientation sensor(s) (e.g., compass) of the mobile device may be used to verify and/or improve the accuracy of the GPS value. The output of the orientation sensor(s) may be cross-correlated with the vector computed between the mobile device and the object. When the direction of the compass and the vector do not line up, the user may be requested to mark their current location on a map, for example, via the GUI.

When the selected pixel(s) correspond to an object with an unknown 3D geo-location, the 3D geo-coordinates may be computed based on a known distance from the mobile device to the object and/or based on a computed distance from the mobile device to the object (e.g., computed based on output of the orientation sensor(s)) and/or based on manually entered distance from the mobile device to the object provided by the user.

When the same object is associated with multiple tags created by different users (e.g., stored in the tag repository) from different directions, the 3D geo-locations may be cross correlated with one another, optionally to arrive at a common value that reduces errors.

Presenting instructions on the GUI to the user for increasing the accuracy of the GPS value, for example, asking the user to move into an open area with a line of sight to satellites and/or towards the entrance to the building, and/or based on a combination of data outputted by a pedometer and a compass in order to associate the location of the object to a known accurate GPS or position fix.

When the tags are being identified for creation of the augmented reality image, and the GPS accuracy and/or resolution is identified as being good but the 3D geo-location of the nearby tags is inaccurate due to the tags being created with low GPS accuracy and/or resolution, the tags stored in the tag repository may be corrected, for example, re-computing the distance and/or direction from the mobile device to the object associated with the tag according to the good GPS values.

When the 3D geo-location of a tag of an augmented reality image is shown as being at a certain location and/or at a certain direction, but the actual location of the object is different (e.g., the compass of the mobile device points in a different direction), then the error may be due to a large GPS offset. For example, when the augmented reality image shows a status as being 10 meters ahead of the user, but actually the status is located 5 meters behind the user, the GPS offset may be 15 meters. In such a case, the user may use the GUI to correct the 3D geo-location of the statue, and/or optionally report the error.

Optionally, when the GPS accuracy and/or resolution is determined to be high according to the requirement, measurements previously computed using GPS values of low accuracy and/or resolution may be improved, for example, 3D geo-locations of tags stored in the tag repository. For example, the accuracy of the location of the imaging sensor may be improved according to an accurate value of a 3D geo-location of a selected pixel(s), when the 2D image of the 3D scene that includes the object corresponding to the selected pixel(s) is captured. In another example, when a highly accurate location of the image sensor is available, the location may be used to improve the accuracy of the 3D geo-location corresponding to selected pixel(s). Other measurements with high accuracy may be used to improve the accuracy of the distance and/or direction between the image sensor and the 3D geo-location corresponding to the selected pixel(s), including digital rulers, magnetometers, public geo-data, and the like.

The following are some exemplary flows for improving accuracy of 3D geo-locations of the object corresponding to pixel(s) selected from a 2D image as described with reference to FIG. 1, implemented by system 300 described with reference to FIG. 3:

When the accuracy of the location of the mobile device outputted by the location sensor is above a threshold indicative of good accuracy, and the selected pixels are not associated with a pre-defined accurate 3D geo-location (e.g., no tag is stored in the tag repository, and/or stored tags have accuracy below the threshold), or the 3D geo-location is known with good accuracy (i.e., above the threshold) and a calculated vector between the location of the mobile device and the object corresponding to the selected pixel(s) matches the accuracy of the 3D geo-location), then the location of the mobile device and the calculated 3D geo-location represent a good accuracy above the threshold and are stored with the created tag in the tag repository.

Irrespective of the accuracy of the location of the mobile device (i.e., above or below the threshold), and when the 3D geo-location of the object corresponding to pixel(s) selected from the 2D image has a known accurate location above the threshold (e.g., stored in the tag repository), and the calculated vector between the location of the mobile device and the object corresponding to the selected pixel(s) does not match the accuracy of the 3D geo-location, then the known 3D geo-location is obtained from the tag repository, and the location of the mobile device is computed by subtracting the obtained 3D geo-location from the calculated vector. The GUI presents instructions to the user to manually and/or automatically correct the location of the mobile device, for example, by manually entering the location on a map and/or performing automatic corrections as described herein.

When an analysis indicates that a correction is possible, an error message may be presented on the GUI. The error message indicates to the user that a correction is possible and urges the user to perform the correction. The message may be presented when the user refuses to perform the correction (e.g., selected not to perform the correction) and/or has delayed in performing the correction of the location of the mobile device (e.g., waiting a time above a threshold). The analysis may be performed, for example, by determining whether a direction outputted by a compass of the mobile device matches (within an error range) the computed direction between the location of the mobile device and the location of the object corresponding to the selected pixels. When the analysis indicates that a correction is not possible (i.e., the direction of the compass does not match the computed direction), a severe alert may be generated and presented on the GUI. The severe alert may trigger a message to computing device 304 acting as a central administration server for further analysis of the problem. The message sent to the computing device 304 acting as server may include relevant data, for example, output of the sensors and computed values. For privacy, the transmitted data may be encrypted, for example, automatically, upon user selection, and/or by a server.

When the location of the mobile device is below the threshold (i.e., indicative of poor accuracy), and no accurate 3D geo-location is available for the object corresponding to the selected pixel(s), the GUI may present a message to the user to manually enter the location (e.g., mark on a map). The calculated vector between the location of the mobile device and the location of the object corresponding to the selected pixel(s) is used to correct the 3D geo-location.

When an analysis indicates that a correction is possible, an error message is presented on the GUI. The error message indicates to the user that a correction is possible and urges the user to perform the correction. The message may be presented when the user refuses to perform the correction (e.g., selected not to perform the correction) and/or has delayed in performing the correction of the location of the mobile device (e.g., waiting a time above a threshold). The analysis may be performed, for example, by determining whether a direction outputted by a compass of the mobile device matches (within an error range) the computed direction between the location of the mobile device and the location of the object corresponding to the selected pixels. When the analysis indicates that a correction is not possible (i.e., the direction of the compass does not match the computed direction), a severe alert may be generated and presented on the GUI. The severe alert may trigger a message to a central administration server for further analysis of the problem. The message sent to the server may include relevant data, for example, output of the sensors and computed values.

The following are some exemplary flows for improving accuracy of mapping the 3D geo-locations of tags to the 2D image for creation of the augmented reality image as described with reference to FIG. 2, implemented by system 300 described with reference to FIG. 3:

When the accuracy of the location of the mobile device is above the threshold (i.e., indicative of good accuracy), and no alert is associated with the tag (e.g., the tag is not out of the field of view of the image sensor and/or is not located behind a larger object and/or the accuracy of the location of the tag is inaccurate), then the augmented reality image is created according to the location of the mobile device and the 3D geo-location of the tag, as described herein.

When the accuracy of the location of the mobile device is below the threshold (i.e., indicative of poor accuracy), and no alert is associated with the tag, and the user uses the GUI to indicate that the original view of the location of the mobile device that created the tag is desired, then the location of the mobile device that created the tag is computed by subtracting the current location of the mobile device from the vector between the original location of the mobile device and the 3D geo-location of the tag. The vector is stored in association with the tag, as described herein. The GUI presents instructions on how to arrive at the original location from the current location according to the subtracted values, for example, by counting steps, audio messages, a map, and/or following a dynamic arrow.

When the accuracy of the location of the mobile device is below the threshold (i.e., indicative of poor accuracy), and the user has not entered (e.g., via the GUI) an indication that the real world object corresponding to the tag on the 2D image is not visible (i.e., the user does not report not seeing the object in the real world), then the 3D geo-location of the tag is considered as accurate and may be further processed.

When the accuracy of the location of the mobile device is below the threshold, and no alert is associated with the tag, and the user has entered via the GUI the indication that the real world object corresponding to the tag on the 2D image is not visible, then the 3D geo-location of the tag is considered as accurate and may be further processed.

When the current direction of the location of the mobile device (e.g., as outputted by the orientation sensor such as the compass) to the location of the object corresponding to the tag presented on the 2D image does not match (within an error range) the direction between the original recorded location of the mobile device that captured the original 2D image for creating the tag (stored in association with the tag), an error message may be presented on the GUI indicating that the user is looking at the object from a wrong direction. The GUI may present instructions on how to move from the current location to the location of the original mobile device, for example, as described herein.

When the accuracy of the location of the mobile device is above the threshold, and a location alert exists for the tag, the location of the tag may be automatically corrected by adding the calculated vector between the current location of the mobile device to the location of the tag to the stored 3D geo-location of the tag, and/or the user may be instructed via the GUI on how to maneuver to see the object.

Figure 5:
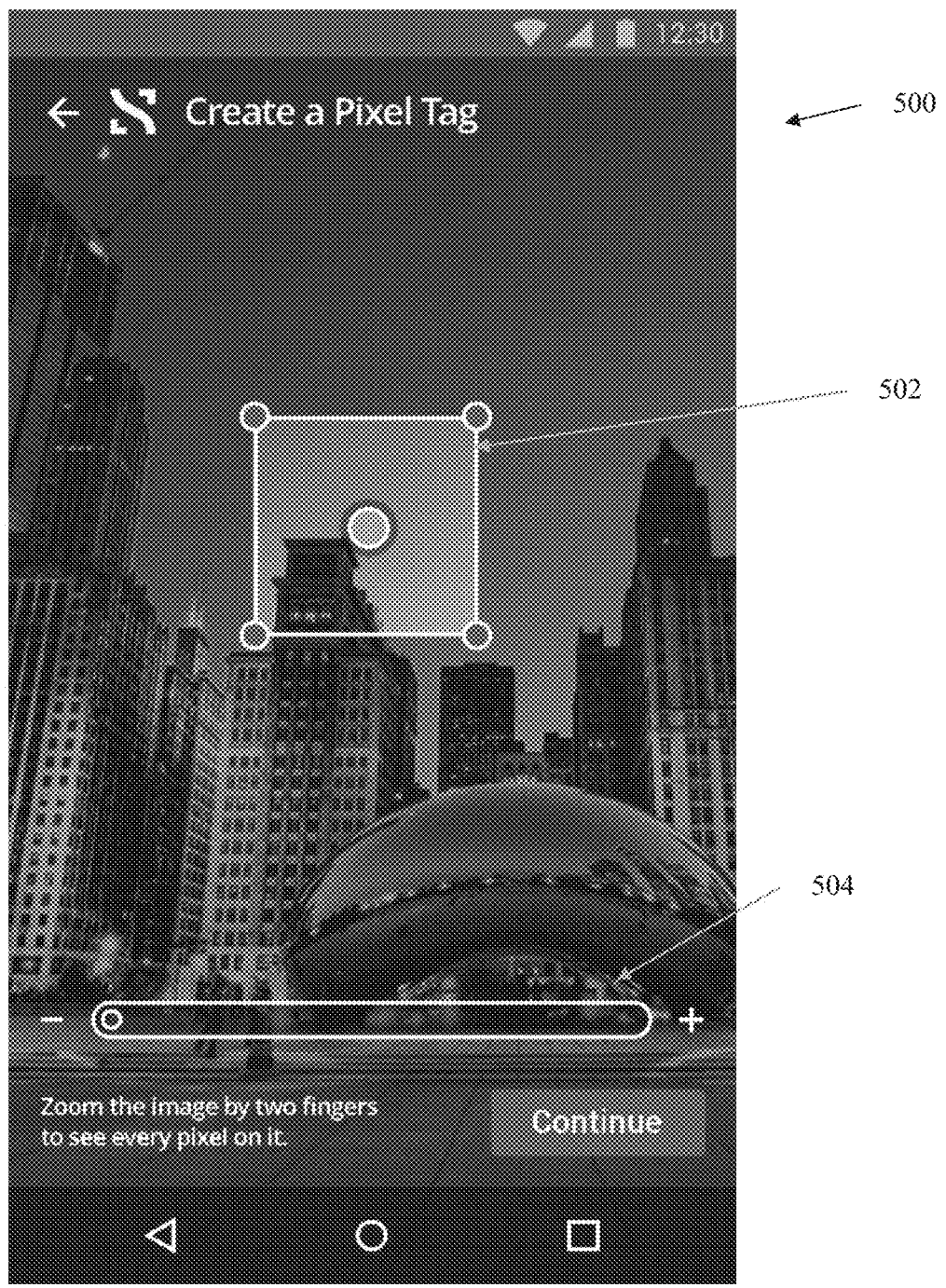
FIG. 5 is an exemplary GUI for creating a tag for an object within a scene for generating an augmented reality 2D image of the object that includes the tag, in accordance with some embodiments of the present invention.

Reference is now made to FIG. 5, which presents an exemplary GUI 500 for creating a tag for an object within a scene for generating an augmented reality 2D image of the object that includes the tag, in accordance with some embodiments of the present invention. GUI 500 presents a 2D image of a 3D scene of a city street that includes multiple multistory buildings. A selection of one or more pixels of the 3D image is made via a box 502 positioned on the 2D image within the GUI. As shown, box 502 includes at least a portion of a tall building, but may be repositioned to capture other objects, for example, the Chicago Bean.

As shown in box 502, a zoom bar or other zoom mechanism (e.g., pinch and zoom technology by touching the screen) enables the user to zoom in the 2D image for selecting individual pixels for tagging. The 3D geo-location of the portion of the selected portion of the object within box 502 is created, as described herein, where the 3D geo-location may include an altitude above ground of the selected portion of the object (e.g., may include top floor(s) of a selected building within box 502, or a portion of the Chicago bean when box 502 is positioned thereto). The tag is created based on box 502, as described herein.

Figure 6:
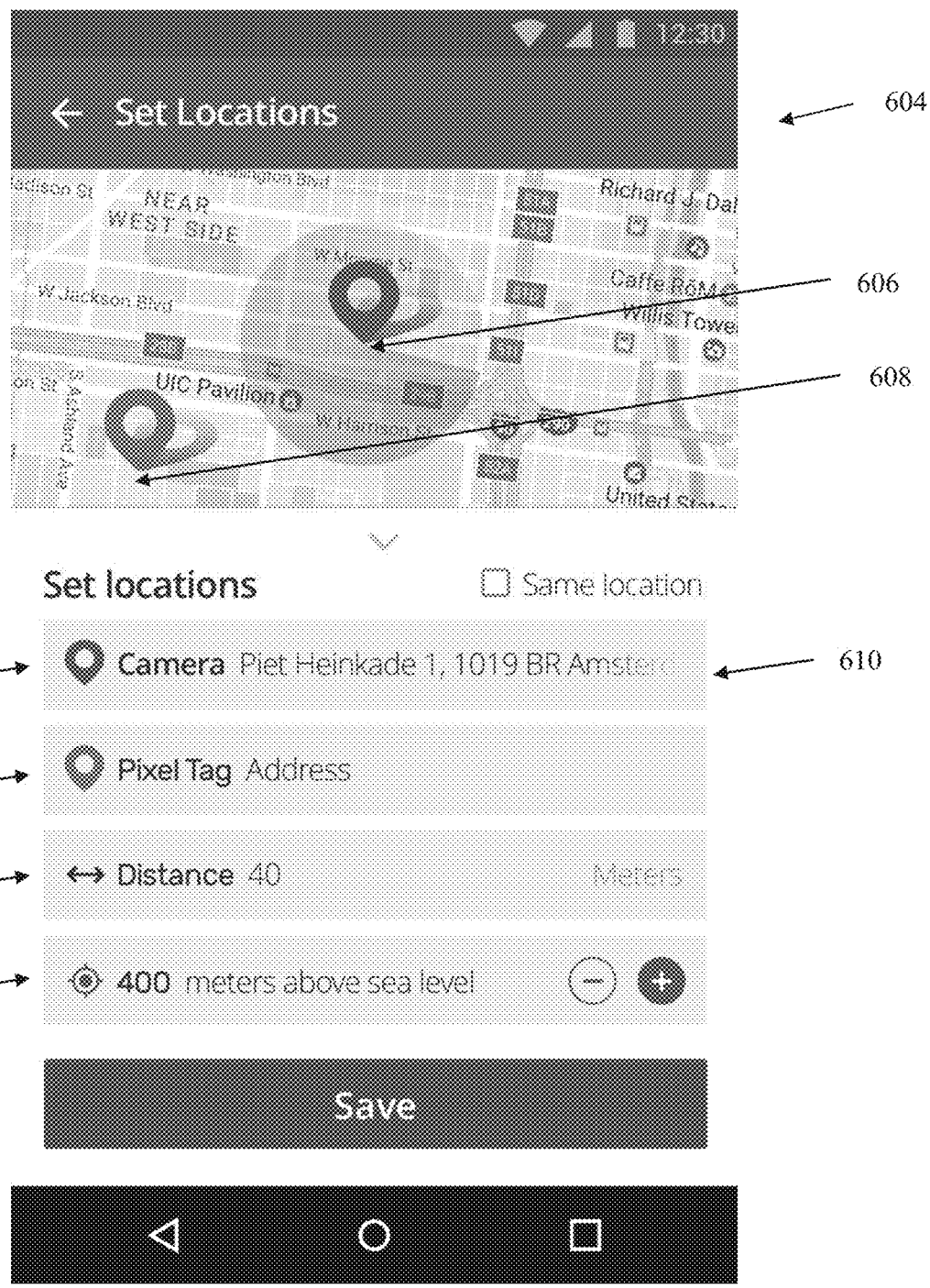
FIG. 6 is an exemplary GUI that presents a 2D street map, and geo-locations of a mobile device and object for which a tag is created according to selected pixel(s) of the object presented in an image captured by the mobile device, accordance with some embodiments of the present invention.

Reference is now made to FIG. 6, which presents an exemplary GUI 604 that presents a 2D street map of the city, and geo-locations of a mobile device 606 and object 608 that was captured in an image and for which a tag was created according to selected pixel(s) of the object, accordance with some embodiments of the present invention. GUI elements 610 present, for example, one or more of the following: street address of the location of mobile device 610A, and/or additional data about object 608, for example, street address of the object 610B, distance 610C between the mobile device and the object, and a height 610D of the location of the tag and/or object (e.g., in meters above sea level). Distance 610C may be used to select the dimension of the presented tag associated with the object, as described herein.

Figure 7:
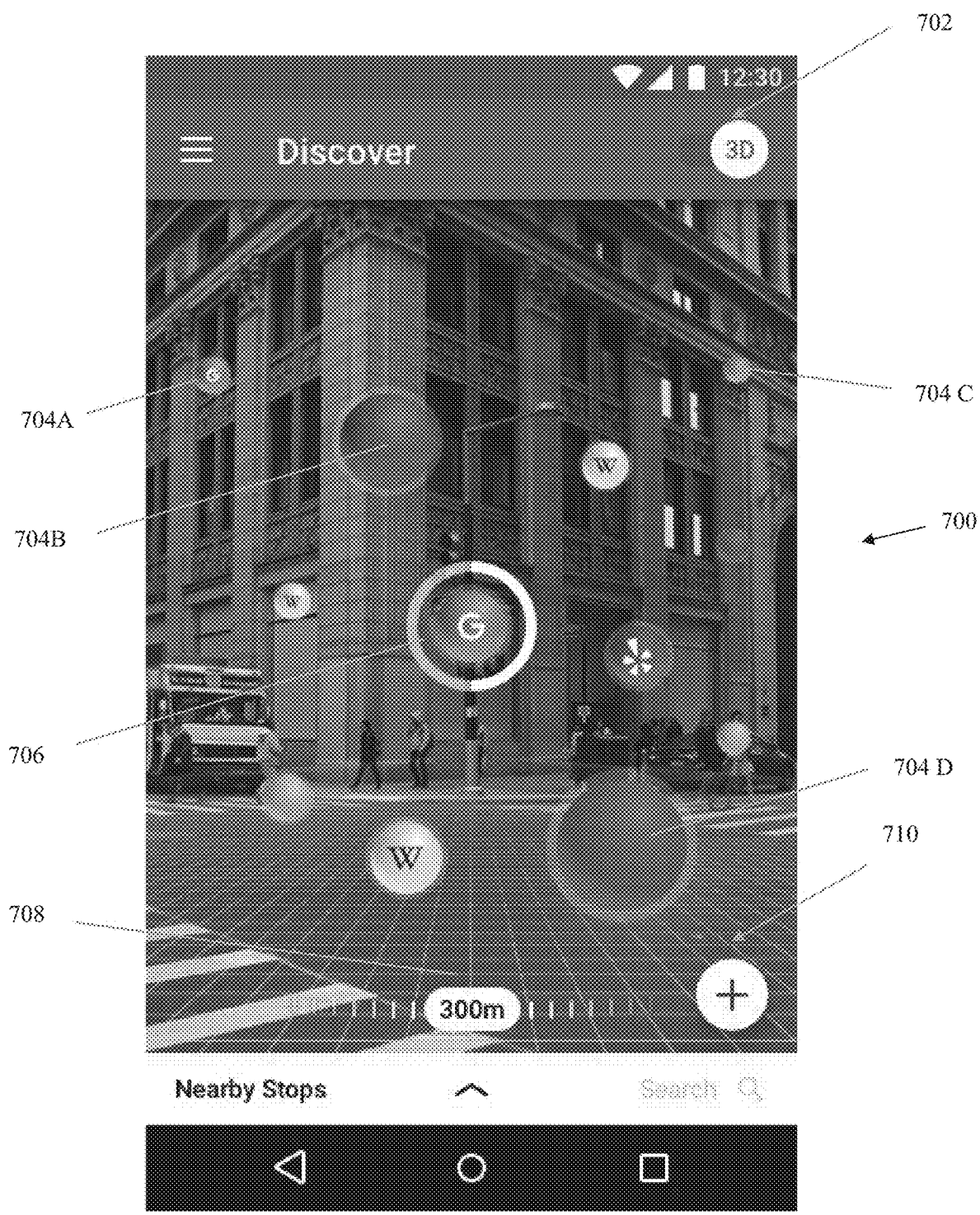
FIG. 7 is an exemplary GUI that depicts an augmented reality 2D image of a street corner captured by a camera that includes multiple tags having sizes corresponding to their respective distances to the camera, in accordance with some embodiments of the present invention.

Reference is now made to FIG. 7, which is an exemplary GUI 700 that depicts an augmented reality 2D image of a street corner captured by a camera that includes multiple tags 702A-D, 706, and 710, in accordance with some embodiments of the present invention. For clarity some tags are not labeled with call out numbers.

Each tag 702A-D, 706, and 710 (shown as a colored circle) is associated with one or more pixels of the 2D image that correspond to respective 3D geo-locations of respective buildings, as described herein.

The dimension (i.e., radius) of circle shaped tags 702A-D, 706, and 710 is presented according to distances (e.g., absolute and/or relative distances). For example, tag 704D is the closest to the camera and is presented with the largest size. Tag 704C is the furthest away from the camera and presented with the smallest size. Other tags are presented with sizes corresponding to their respective distance to the camera, as described herein.

GUI element 700 provides a mechanism (e.g., icon) for selecting 2D mode or 3D mode. 3D mode depicts a camera view (i.e., as currently presented). 2D mode may be a radar view that presents tags on a 2D street map without depicting altitude.

Tag 706 is selected by a user (e.g., by tapping the tag on the screen, using a cursor, by speaking and code that analyzes the recorded speech, and the like). Additional information about the object corresponding to tag 706 may be presented, for example, within GUI 700, for example, street address, what the object is, history of the object, height of the object, and the like. Tag 706 may be linked to externally residing information, for example, residing on a Wikipedia™ server.

GUI element 708 presents a maximum distance from the camera to the furthest presented tag (i.e., 704C), for example, 300 meters is shown.

GUI element 710 triggers the feature of adding additional tags to the 3D scene, as described herein.

GUI 700 may include a zoom controller (not shown) that magnifies the presented image to better discern which pixels map to respective tags 702A-D, 706, and 710.

It is noted that tags that are associated with 3D geo-location may be added automatically. For example, the Wikipedia API is used to add tags matching objects that are described by Wikipedia™ on certain locations.

Figure 8:
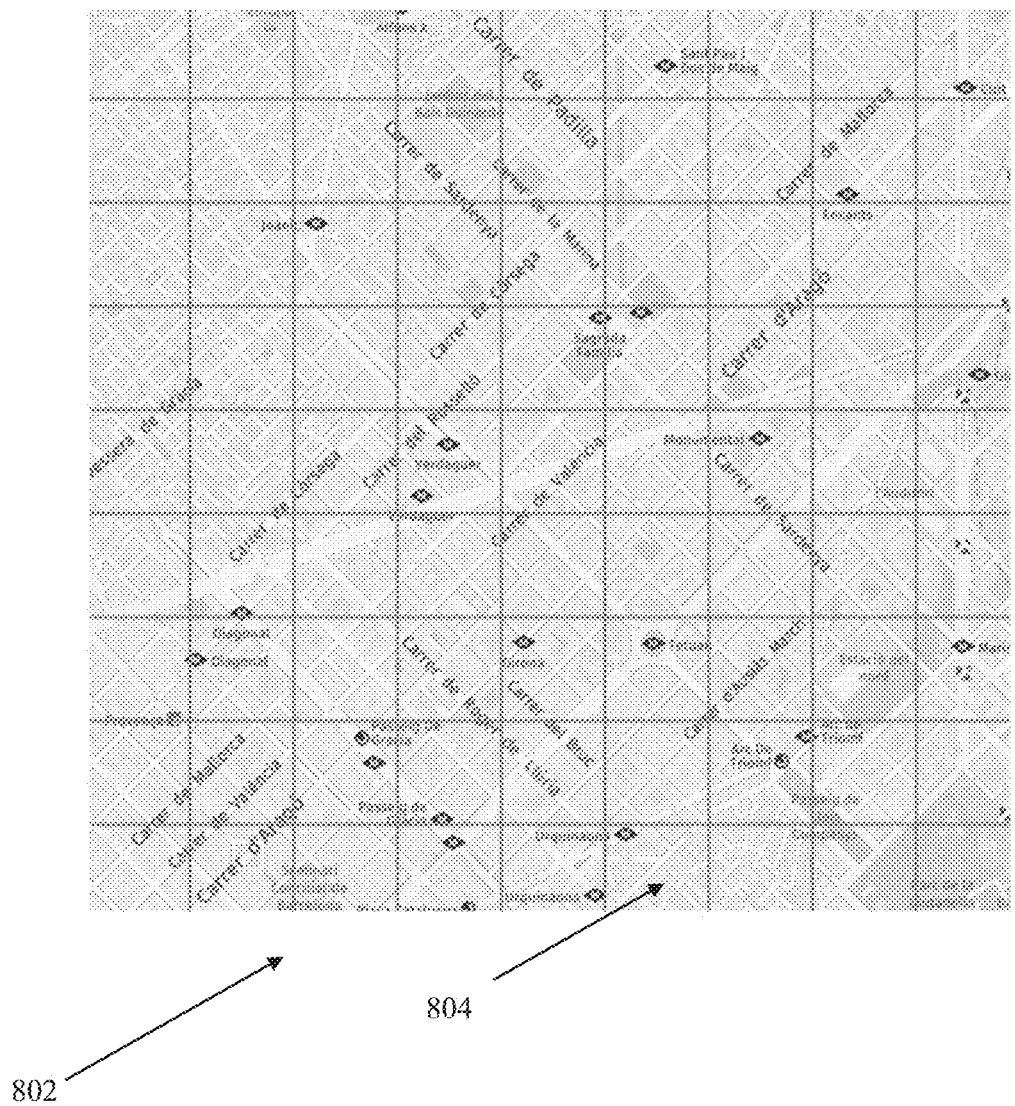
FIG. 8 is a schematic example that depicts a virtual grid with reference to real world coordinates, for mapping of objects and/or tags between virtual coordinates and real world coordinates, in accordance with some embodiments of the present invention.

Reference is now made to FIG. 8, which is a schematic that depicts a virtual grid with reference to real world coordinates, for mapping of objects and/or tags between virtual coordinates and real world coordinates, in accordance with some embodiments of the present invention. A 2D portion of the virtual grid (e.g., the 3D grid described herein) is presented with reference to a 2D street map. Edges of every 2D square (grid) 804 of the virtual grid is mapped to a surface map 802 which has an independent set of 2D coordinates representing real world physical locations (latitude and longitude).

Figure 9:
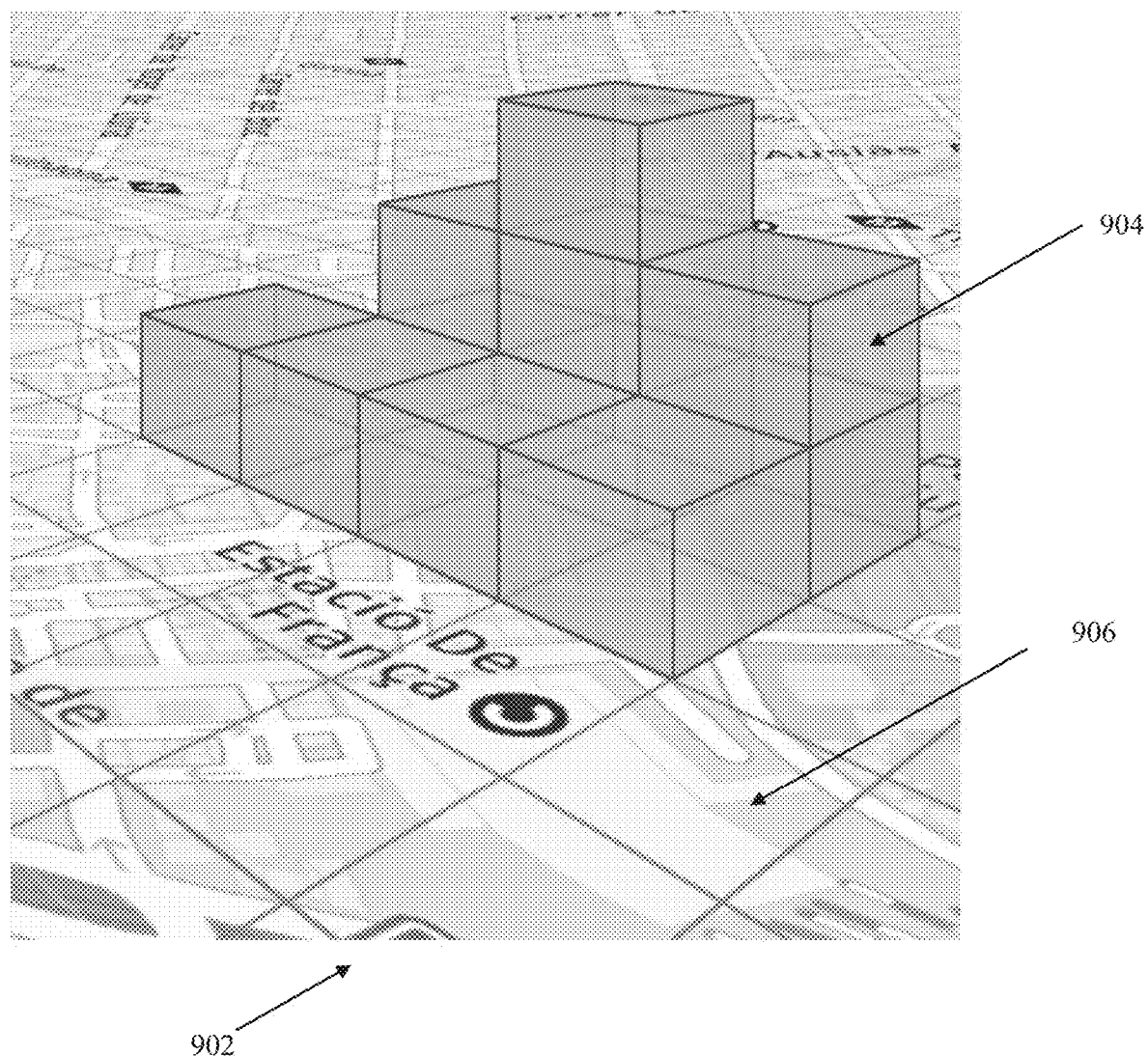
FIG. 9 is a schematic that depicts a virtual 3D grid with reference to real world 3D coordinates, for mapping of objects and/or tags between 3D virtual coordinates and 3D real world coordinates, in accordance with some embodiments of the present invention, in accordance with some embodiments of the present invention.

Reference is now made to FIG. 9, which is a schematic that depicts a virtual 3D grid with reference to real world 3D coordinates, for mapping of objects and/or tags between 3D virtual coordinates and 3D real world coordinates, in accordance with some embodiments of the present invention. A 3D portion of the virtual grid is presented with reference to a 3D street map. Edges of every 3D cube 904 of the 3D virtual grid is mapped to a 3D surface map 902 which has an independent set of 3D coordinates representing real world physical locations. The 3D virtual coordinates (e.g., length, width, height) are mapped to 3D real world coordinates (e.g., latitude, longitude, and height based on ground level and/or based on sea level). A 2D portion 906 of the 3D grid is shown for reference.

Figure 10:
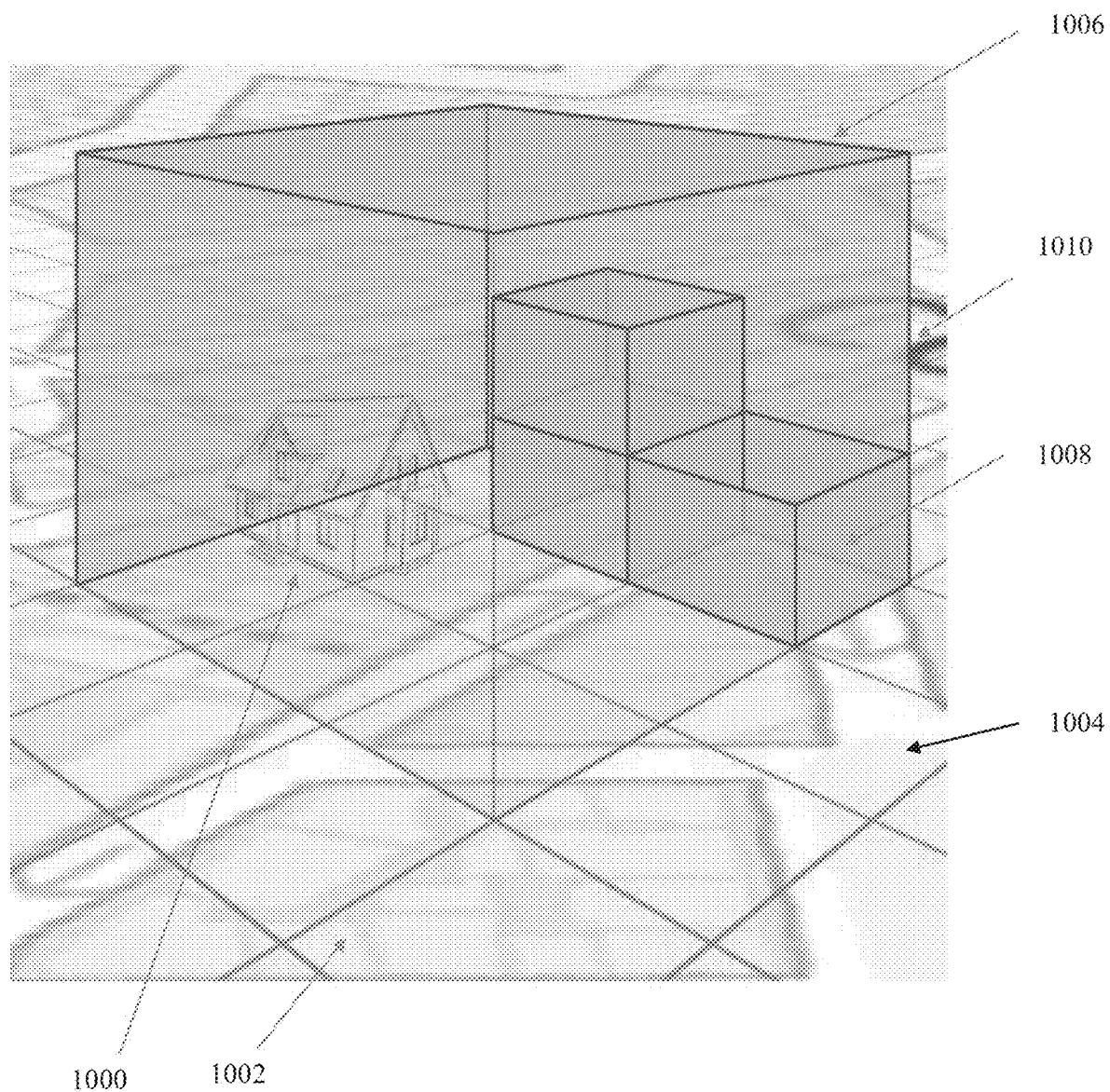
FIG. 10 is a schematic depicting a physical object having real world coordinates according to a real world coordinate system mapped to virtual coordinates by a 3D virtual grid, in accordance with some embodiments of the present invention.

Reference is now made to FIG. 10, which is a schematic depicting a physical object 1000 (e.g., house) having real world coordinates according to a real world coordinate system 1002 mapped to virtual coordinates by a 3D virtual grid 1004, in accordance with some embodiments of the present invention. 3D virtual grid 1004 may include nested levels of cubes, where a larger cube 1010 has multiple small sub-cubes 1008 defined therein. Each cube 1010 and/or sub-cube 1008 may be assigned a reference value, and uses a local virtual coordinate system therein. For example, each large cube 1010 is assigned a unique ID. Small sub-cubes 1008 are each assigned a sub-ID which is unique to the sub-cube 1008 within the larger cube 1010, with each large cube 1010 optionally using the same sub-IDs for the cubes within. Each sub-cube 1008 is defined with a virtual coordinate system, which is optionally re-used for each sub-cube 1008. The virtual address of an object and/or tag may be defined as coordinates within the sub-cube 1008, the ID of the sub-cube 1008, and the ID of the large cube 1010. Object 1000 may be assigned two addresses, a real world set of coordinates relative to a 2D or 3D surface map 1004, and a set of virtual coordinates defined by 3D virtual grid 1004, optionally based on large cube 1010 and/or sub-cubes 1008 and/or virtual coordinates thereof.

Figure 11:
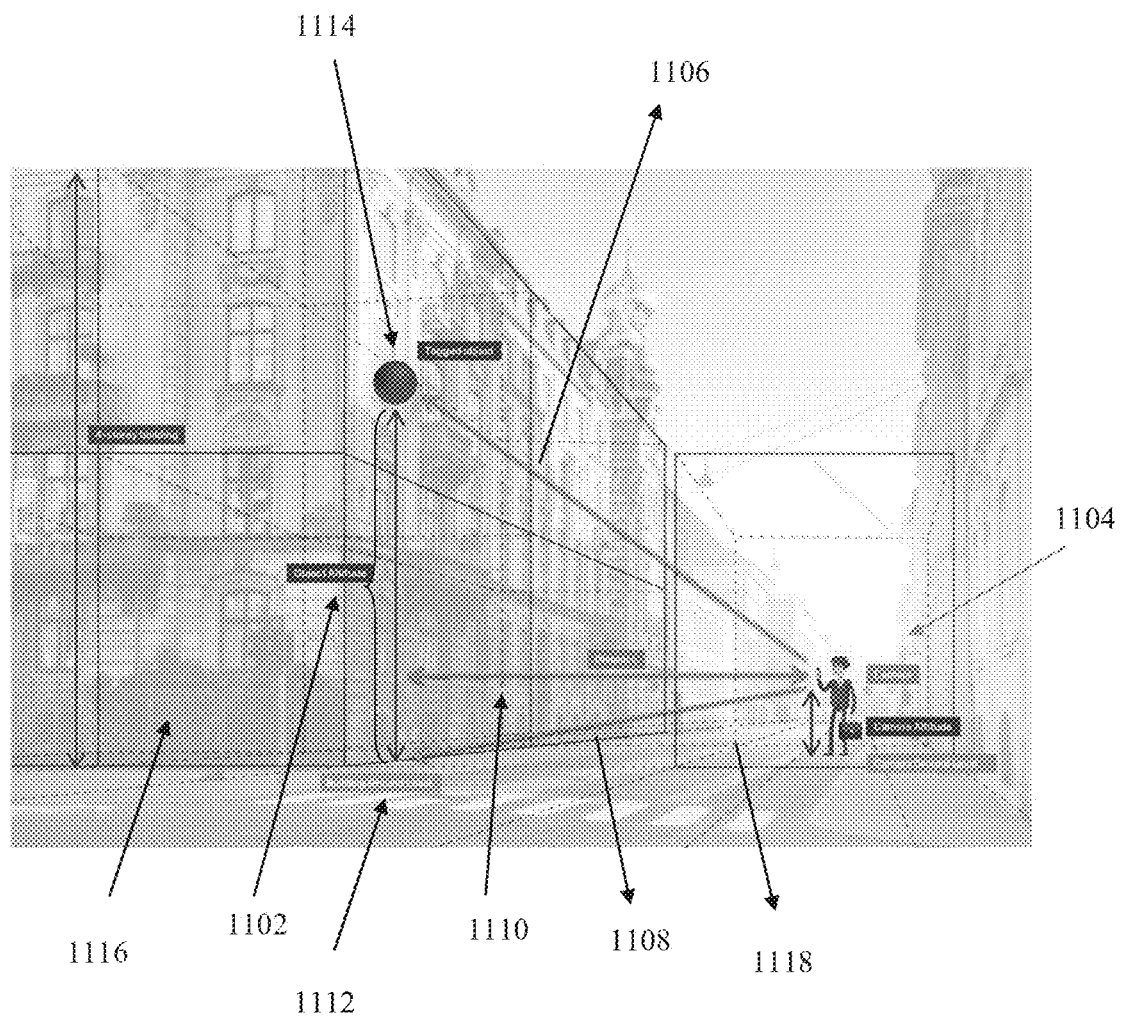
FIG. 11 is a schematic depicting an example of assigning a tag to a real world object (e.g., building), where the virtual coordinates of the tag are mapped to the real world coordinates of the object by a 3D virtual grid, in accordance with some embodiments of the present invention.

Reference is now made to FIG. 11, which is a schematic depicting an example of assigning a tag 1114 to a real world object 1116 (e.g., part of a 4 story building), where the virtual coordinates of the tag 114 are mapped to the real world coordinates of the object 1116 by a 3D virtual grid 1118, in accordance with some embodiments of the present invention. Real world coordinates of object 1116 are computed as described herein. 3D virtual grid 1118 defined as described herein. Virtual coordinates of selected pixel(s) of 2D image, i.e., tag 1114 are computed as described herein.

Computation of an altitude 1102 of tag 1114 corresponding to the selected pixel(s) of the 2D image is computed as described herein. The altitude 1102 defined using physical world coordinates is mapped to the virtual coordinates using the 3D virtual grid, as described herein.

Altitude 1102 of selected location of building 1116 above ground corresponding to the pixel(s) 1114 selected by the user, is calculated as described herein, according to the height above ground of the image sensor 1104 (e.g., camera), alpha 1106 or beta 1108 indicating the tilt of the image sensor above or below a plane parallel to the ground, a distance between the imaging sensor and the building 1110, and an altitude of the building above ground level (and/or above sea level) 1112.

Figure 12:
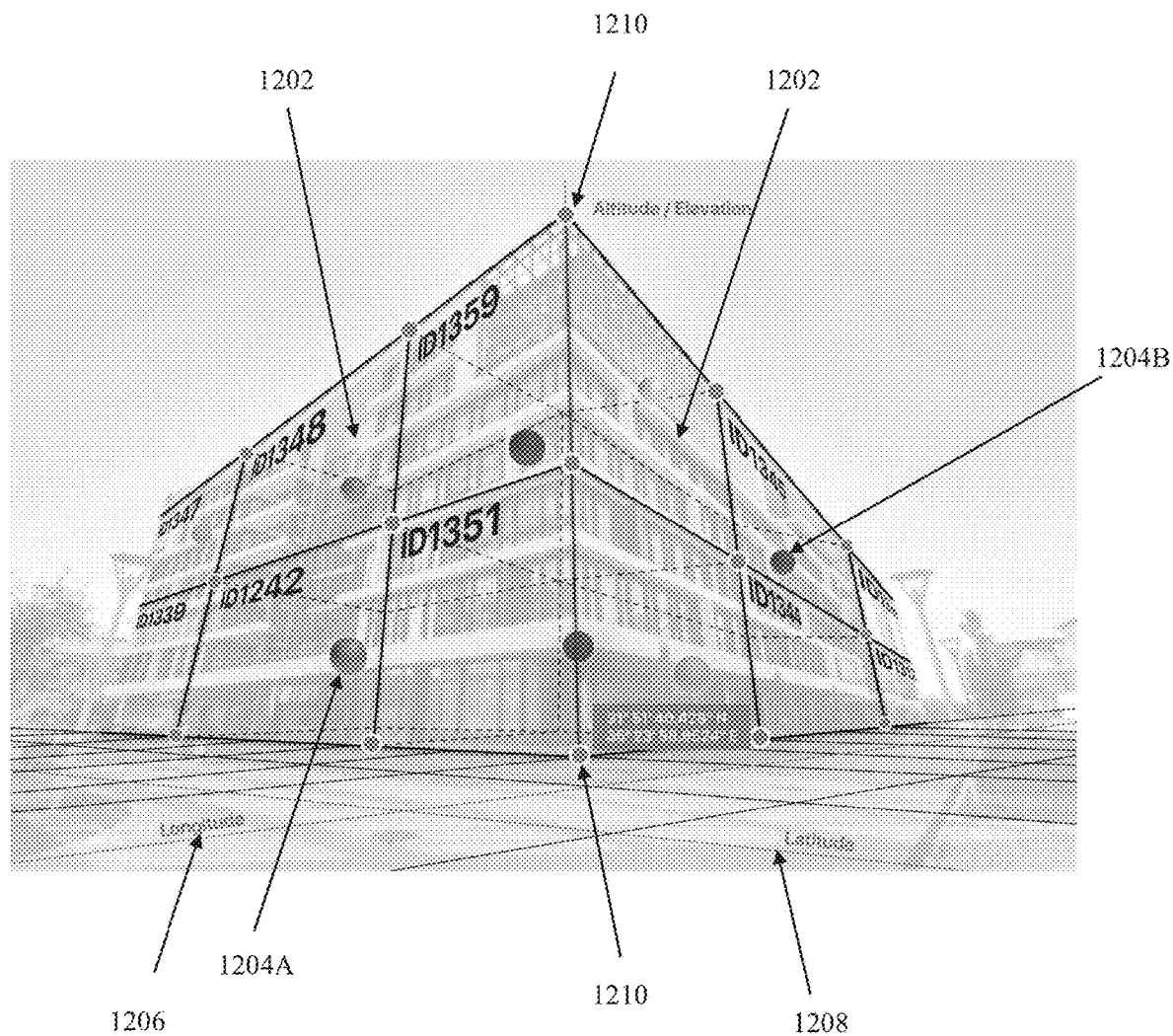
FIG. 12 is a schematic depicting a 3D street view of a geo-fenced area of a virtual 3D grid mapped to real world coordinates, in accordance with some embodiments of the present invention.

Reference is now made to FIG. 12, which is a schematic depicting a 3D street view 1202 of a geo-fenced area of a virtual 3D grid mapped to real world coordinates, in accordance with some embodiments of the present invention. Street view 1202 depicts a building, where tags 1204A-B are mapped between virtual coordinates of the virtual 3D grid to real world coordinates, for example, defined by longitude 1206, latitude 1208, and altitude 1210. 3D virtual grid may be defined according to cubes 1202 each having a unique ID, for example cube 1202 has a unique ID of 1348. Each cube may be further sub-divided into sub-cubes, and/or use a local virtual coordinate system, as described herein. The 3D virtual grid is mapped to the real world coordinates, for example, Point 1210 in cube having ID 1351 maps to the virtual coordinates of the cube (e.g., 0,0,0, or other local virtual coordinate values) and to the real world coordinates 31°51'40.428"N, 35°23'58.9524"E, 0 (altitude of zero), according to real world coordinate system defined by longitude 1206, latitude 1208, and altitude 1210.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant mobile devices and image sensors will be developed and the scope of the terms mobile devices and image sensor are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A computer implemented method of creating at least one tag for an object within a scene for generating an augmented reality 2D image of the object that includes the at least one tag, comprising:

capturing by an imaging sensor of a mobile device, a single two dimensional (2D) image of a three dimensional scene (3D) comprising a plurality of objects and pixel neighborhoods therein;

selecting with a graphical user interface (GUI) presented on a display of the mobile device, at least one 2D pixel of the single 2D image corresponding to a certain object of the plurality of objects;

computing a 3D geo-location of the certain object corresponding to the selected at least one 2D pixel of the single 2D image, wherein the 3D geo-location includes an altitude relative to sea level, and wherein the 3D geo-location is geographically distinct and spaced apart from a location of the imaging sensor outputted by a location sensor;

creating at least one tag for the selected at least one 2D pixel of the certain object of the single 2D image according to the computed 3D geo-location, wherein the at least one tag maps to at least one media-object;

mapping the 3D geo-location of the certain object defined in a real world physical coordinate system to a certain 3D cell of a plurality of 3D cells of a 3D virtual grid defining a virtual coordinate system, the 3D geo-location mapped to the certain 3D cell as a whole; and mapping the at least one tag for the selected at least one 2D pixel of the certain object to a certain location of a plurality of locations within the certain 3D cell defined by the virtual coordinate system;

wherein a range of the real world physical coordinate system is mapped to a same 3D cell of the plurality of 3D cells, wherein when 3D geo-locations of a plurality of objects fall within the range, the 3D geo-locations of the plurality of objects are mapped to the same 3D cell.

2. The method of claim 1, further comprising computing at least one dimension of the created at least one tag according to a distance between the 3D geo-location of the certain object corresponding to the selected at least one pixel and the location of the imaging sensor, wherein the at least one dimension is proportional to the distance.

3. The method of claim 1, wherein the 3D geo-location of the certain object corresponding to at least one pixel of the single 2D image is located externally to an accuracy range of the location sensor, wherein objects within the accuracy range are outputted as located in the same area by the location sensor, the accuracy of the accuracy range is enhanced based on at least one member of a group consisting of: a camera focus, manual entry, and distance measurement sensor, wherein the distance measurement sensor comprises an ultrasonic wave sensor and/or laser sensor, wherein the 3D geo-location of the at least one tag of the selected at least one pixel of the certain object further includes an absolute elevation relative to ground level, wherein the 3D geo-location includes at least one of: a value indicative of an altitude below sea level, and a value indicative of a level below ground level.

4. The method of claim 1, wherein the 3D geo-location of the certain object corresponding to the selected at least one pixel of the 2D image is computed according to location of the mobile device outputted by at least one location sensor associated with the mobile device, an orientation of the mobile device outputted by at least one orientation sensor associated with the mobile device, and a location of the certain object, wherein the at least one location sensor comprises at least one of: a satellite based positioning system sensor and an altimeter, wherein the at least one orientation sensor comprises at least one of: a compass, a magnetometer, a gyroscope, and a tilt sensor, wherein the location of the certain object is obtained from a server storing a map of geographical and/or topographic data, further comprising computing the location of the certain object according to a distance and a direction from the mobile device to the certain object, wherein the height of the certain object above ground level is computed according to the mathematical relationship: distance from the location of the mobile device to the location of the certain object multiplied by a tangent of the tilt angle of the image sensor plus the difference between the altitude of the image sensor and the altitude of the certain object plus the height of the image sensor above ground.

5. The method of claim 4, at least one of: wherein the height of the image sensor above ground corresponds to an estimate of an average height of an average user from a specific geographical region, and wherein the height of the image sensor above ground is according to a manually-entered height of a current user.

6. The method of claim 1, wherein the 3D geo-location of the certain object is set according to the location of the mobile device outputted by at least one location of the mobile device when the mobile device is located at a location corresponding to the certain object; and wherein the single 2D image of the 3D scene including the certain object is captured when the mobile device is located at a location remote to the location of the certain object.

7. The method of claim 1, wherein the at least one tag stores a set of rules defining at least one of: dynamic movement of the certain object corresponding to the selected at least one pixel, and future times when the certain object corresponding to the selected at least one pixel is visible.

8. The method of claim 1, wherein the at least one tag for the selected at least one pixel of the certain object is mapped to a certain nested cube of a plurality of nested cubes of the certain 3D cell.

9. The method of claim 1, wherein each 3D cell is assigned a unique address within the virtual coordinate system, and a respective local virtual coordinate system is defined for each one of the plurality of 3D cells, and the at least one tag is mapped to a certain location defined by the respective local virtual coordinate system defined for the certain 3D cell.

10. The method of claim 1, wherein the at least one tag is stored within the 3D virtual grid according to a unique identification of the certain 3D cell and according to a unique identification of the certain location within the certain 3D cell.

11. The method of claim 1, wherein a resolution of the mapping of 3D geo-locations to the certain 3D cell as a whole is significantly lower than a resolution of the mapping of the at least one tag to the certain location within the certain 3D cell.

12. A system for creating at least one tag for an object within a scene for generating an augmented reality single 2D image of the object that includes the at least one tag, comprising:
a non-transitory memory having stored thereon a code for execution by at least one hardware processor, the code comprising:
code for capturing by an imaging sensor of a mobile device, a single two dimensional (2D) image of a three dimensional scene (3D) comprising a plurality of objects;
code for selecting with a graphical user interface (GUI) presented on a display of the mobile device, at least one 2D pixel of the single 2D image corresponding to a certain object of the plurality of objects;
code for computing a 3D geo-location of the certain object corresponding to the selected at least one 2D pixel of the single 2D image, wherein the 3D geo-location includes an altitude relative to sea level, and wherein the 3D geo-location is geographically distinct and spaced apart from a location of the imaging sensor outputted by a location sensor;
code for creating at least one tag for the selected at least one 2D pixel of the certain object of the single 2D image according to the computed 3D geo-location, wherein the at least one tag maps to at least one media-object;
mapping the 3D geo-location of the certain object defined in a real world physical coordinate system to a certain 3D cell of a plurality of 3D cells of a 3D virtual grid defining a virtual coordinate system, the 3D geo-location mapped to the certain 3D cell as a whole; and
mapping the at least one tag for the selected at least one 2D pixel of the certain object to a certain location of a plurality of locations within the certain 3D cell defined by the virtual coordinate system;
wherein a range of the real world physical coordinate system is mapped to a same 3D cell of the plurality of 3D cells, wherein when 3D geo-locations of a plurality of objects fall within the range, the 3D geo-locations of the plurality of objects are mapped to the same 3D cell.

* * * * *